(12) United States Patent
Krzywon

(10) Patent No.: US 12,077,279 B2
(45) Date of Patent: Sep. 3, 2024

(54) SYSTEM AND METHOD FOR DETECTING AND MITIGATING A PROPELLER FAILURE CONDITION

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 543 days.

(21) Appl. No.: 17/241,915

(22) Filed: Apr. 27, 2021

(65) Prior Publication Data

US 2022/0340260 A1    Oct. 27, 2022

(51) Int. Cl.
| | | |
|---|---|---|
| *B64C 11/38* | (2006.01) | |
| *B64C 11/30* | (2006.01) | |
| *B64D 45/00* | (2006.01) | |
| *F01D 7/02* | (2006.01) | |
| *F01D 21/00* | (2006.01) | |

(52) U.S. Cl.
CPC .......... *B64C 11/385* (2013.01); *B64C 11/301* (2013.01); *B64D 45/00* (2013.01); *F01D 7/02* (2013.01); *F01D 21/003* (2013.01); *B64D 2045/0085* (2013.01)

(58) Field of Classification Search
CPC . F01D 21/003; F01D 7/00; F01D 7/02; F05D 2260/80; F03D 17/00; F03D 17/002; F03D 17/013; F03D 17/014; F03D 17/029; B64C 11/301; B64C 11/303; B64C 11/38; B64C 11/385; B64C 11/40; B64C 11/44; B64D 2045/0085; B64D 45/00
See application file for complete search history.

(56) References Cited

U.S. PATENT DOCUMENTS

| | | | |
|---|---|---|---|
| 2,918,129 A | 12/1959 | Brandes et al. | |
| 3,112,901 A | 12/1963 | Kohman | |
| 6,261,062 B1 | 7/2001 | Amerling et al. | |
| 6,638,017 B1 * | 10/2003 | Olsen .................... | B64C 11/44 |
| | | | 416/30 |
| 10,501,169 B2 | 12/2019 | Waddleton | |
| 2019/0092453 A1 | 3/2019 | Hoemke et al. | |

FOREIGN PATENT DOCUMENTS

| | | |
|---|---|---|
| EP | 3712058 | 9/2020 |
| EP | 3741666 | 11/2020 |

* cited by examiner

*Primary Examiner* — Christopher Verdier
(74) *Attorney, Agent, or Firm* — NORTON ROSE FULBRIGHT CANADA LLP

(57) ABSTRACT

There is provided a method and a system for detecting and mitigating a propeller failure condition. An actual value of a rotational speed of the propeller and/or of a pitch angle of blades of the propeller is obtained. In response to determining that the speed is below a reference rotational speed for the propeller and/or determining that the pitch angle is above a pitch angle threshold, an actuator operatively connected to the blades is commanded to decrease the pitch angle to increase the speed towards the reference speed. After commanding of the actuator to decrease the pitch angle, a subsequent value of the speed and/or a subsequent value of the pitch angle is obtained. The actuator is commanded to hold the pitch angle in response to determining that the speed has failed to increase towards the reference speed and/or determining that the pitch angle has failed to decrease.

20 Claims, 13 Drawing Sheets

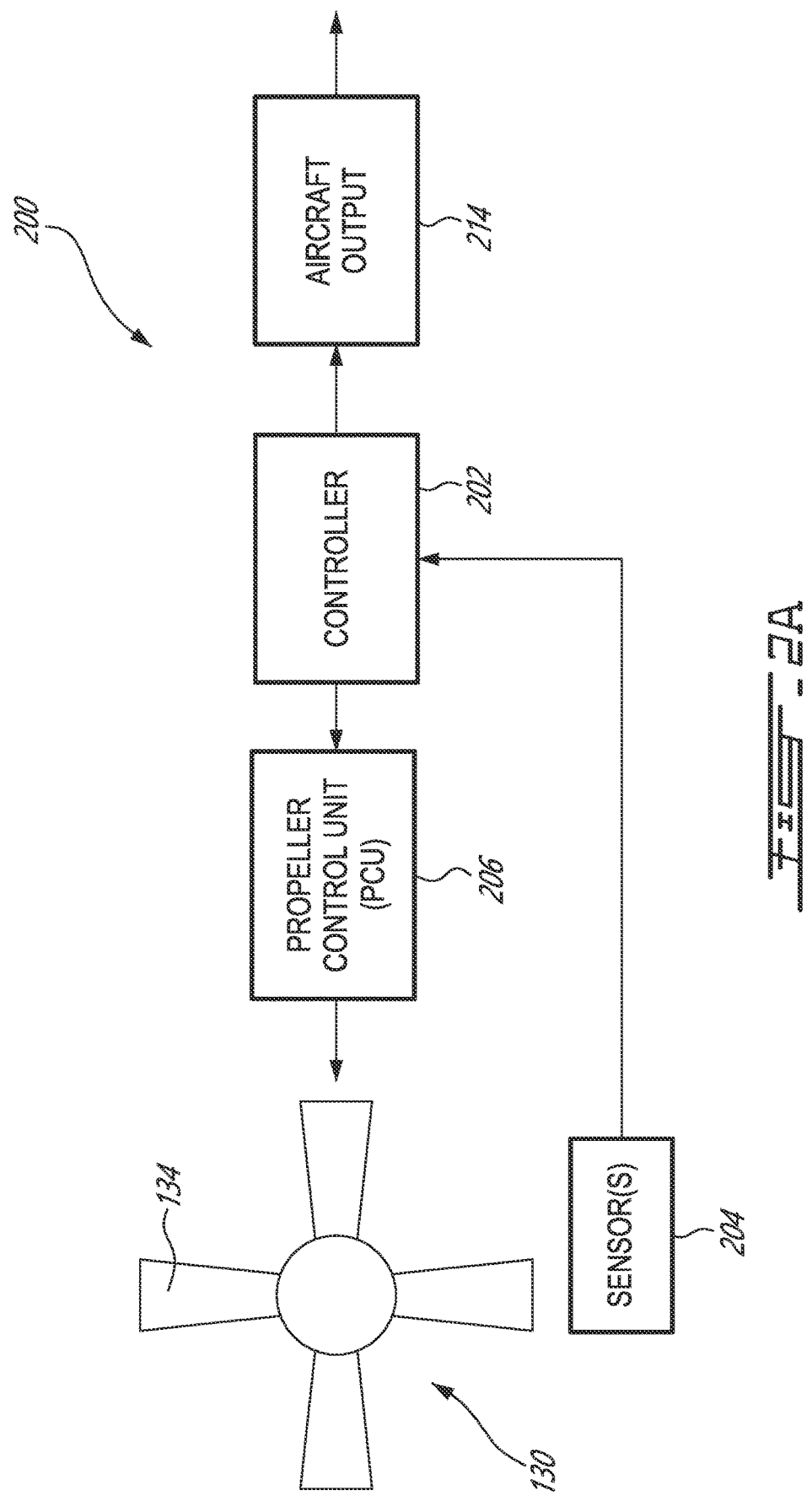

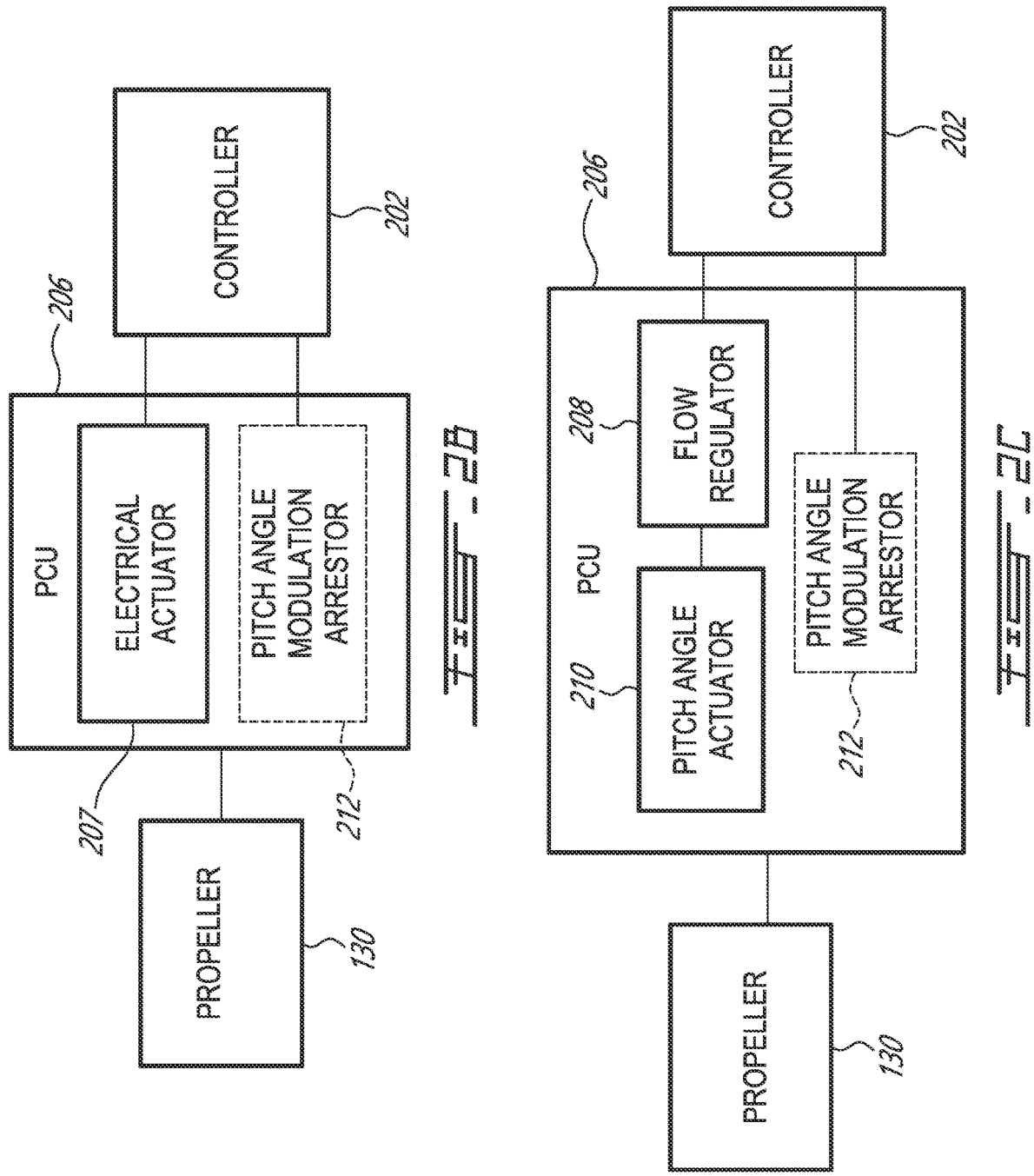

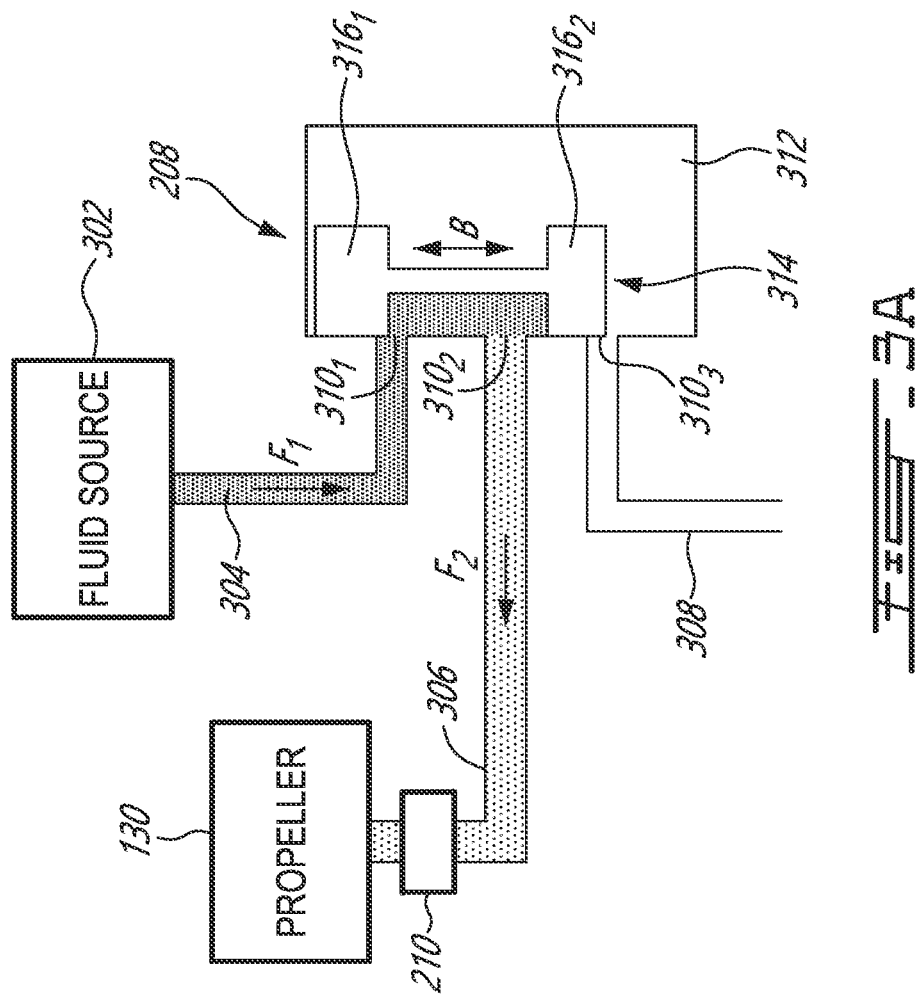

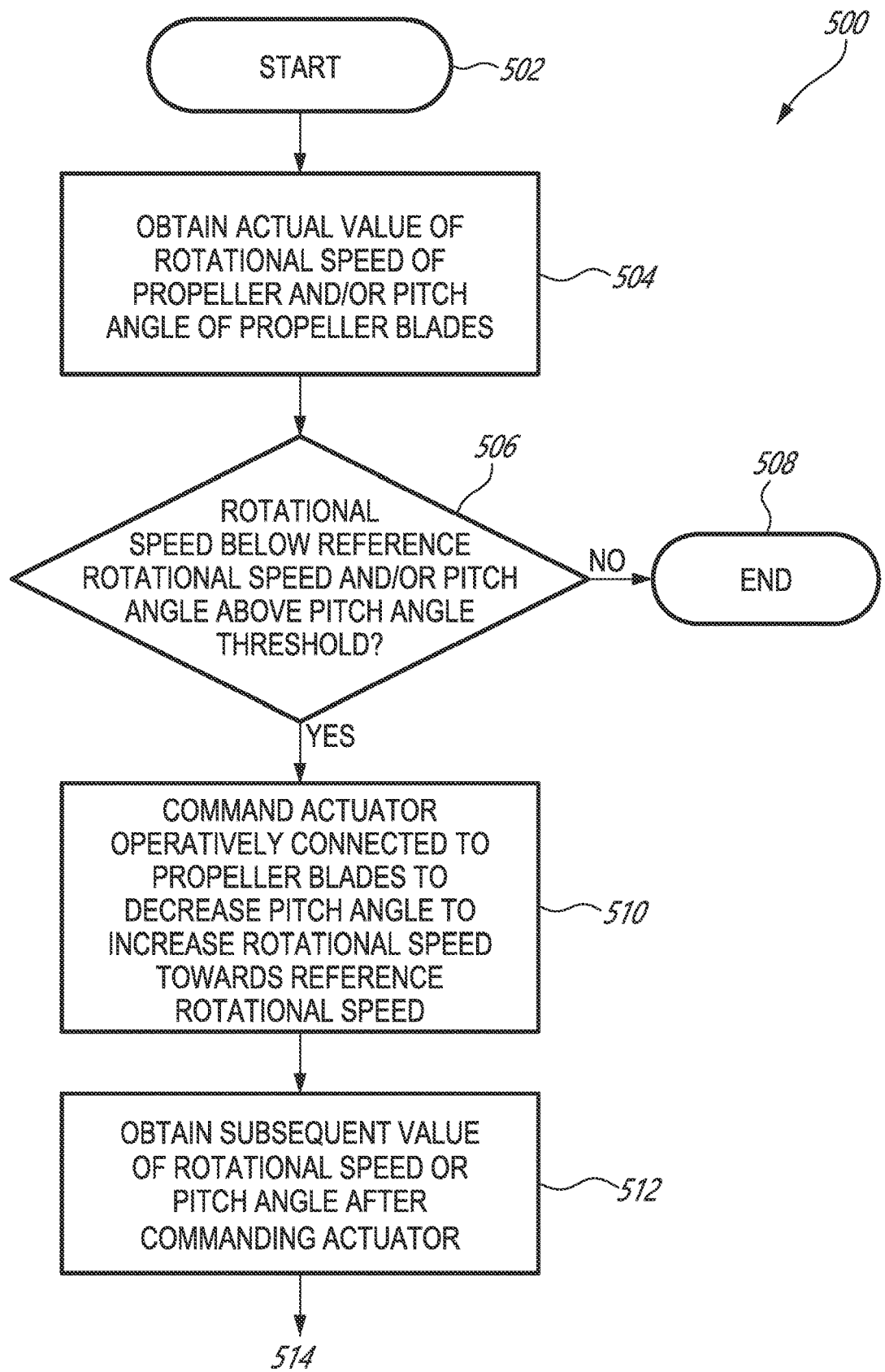

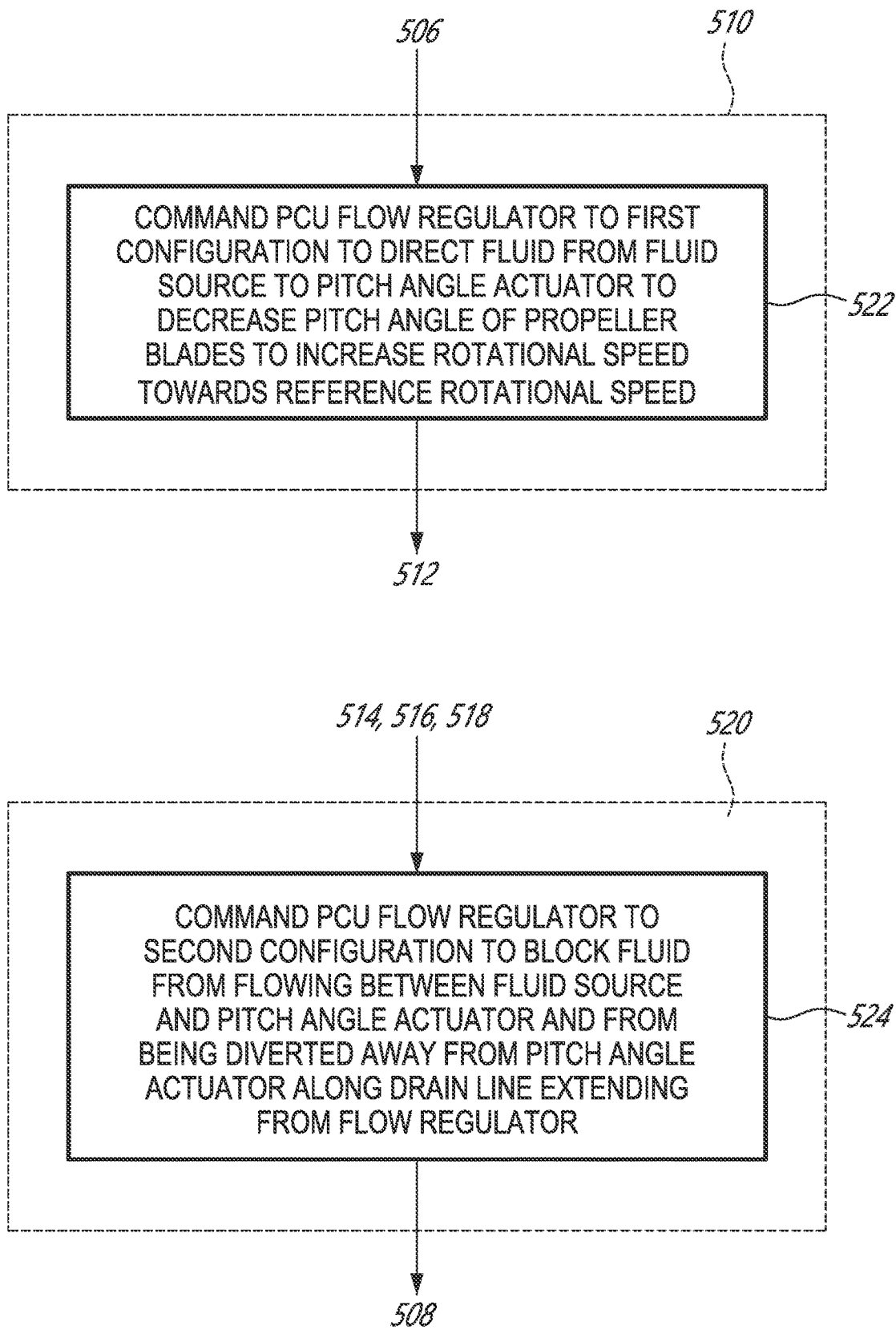

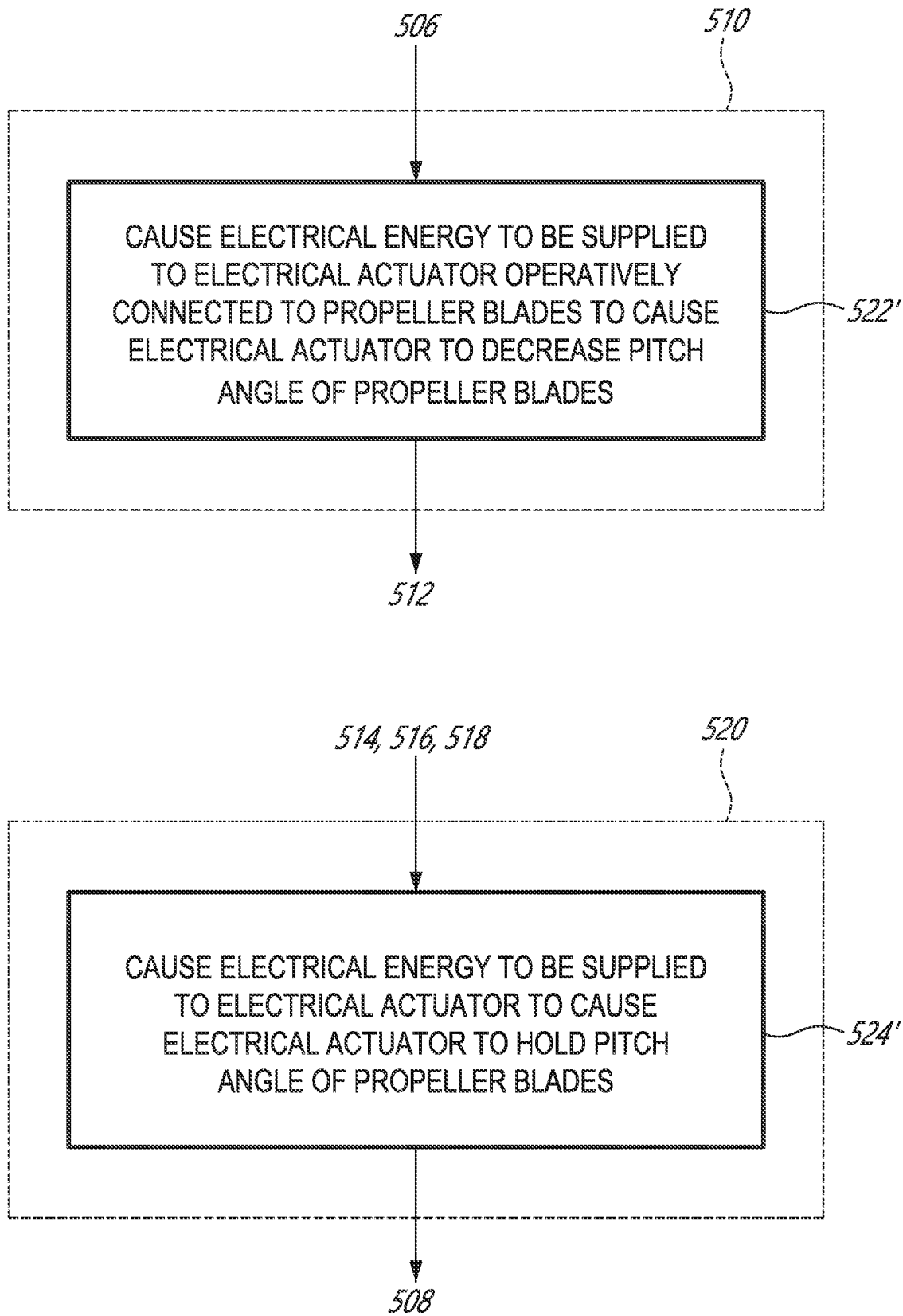

SYSTEM AND METHOD FOR DETECTING AND MITIGATING A PROPELLER FAILURE CONDITION

TECHNICAL FIELD

The application relates generally to aircraft engines, and, more particularly, to propeller controllers of propeller-driven aircraft engines.

BACKGROUND OF THE ART

Certain aircraft engines are mechanically coupled to propellers, which produce thrust to propel the aircraft. Typically, a propeller control unit provided for use with the propeller serves to effect control of the operation of the propeller, including to control pitch angles of the blades of the propeller, and to control the rotational speed of the propeller. The propeller control unit is actuated by way of a fluid, which is supplied under pressure to achieve target values of propeller speed and pitch angle. While prior art systems of this type may be suitable for their intended purposes, improvements are always desirable.

SUMMARY

In one aspect, there is provided a method for detecting and mitigating a failure condition of a propeller driven by an engine of an aircraft, the propeller having a plurality of variable pitch propeller blades, the method comprising at a controller, obtaining one or both of an actual value of a rotational speed of the propeller and an actual value of a pitch angle of the blades, in response to one or both of determining, based on the actual value of the rotational speed, that the rotational speed is below a reference rotational speed for the propeller and determining, based on the actual value of the pitch angle, that the pitch angle is above a pitch angle threshold, commanding an actuator operatively connected to the blades to decrease the pitch angle to increase the rotational speed towards the reference rotational speed, obtaining, after the commanding of the actuator to decrease the pitch angle, one or both of a subsequent value of the rotational speed and a subsequent value of the pitch angle, and commanding the actuator to hold the pitch angle in response to one or both of determining, based on the subsequent value of the rotational speed, that the rotational speed has failed to increase towards the reference rotational speed, and determining, based on the subsequent value of the pitch angle, that the pitch angle has failed to decrease.

In some embodiments, the actuator includes one of or a combination of: an electrical actuator and a hydraulic actuator.

In some embodiments, the commanding the actuator to decrease the pitch angle comprises commanding a flow regulator located between a fluid source and a pitch angle actuator operatively connected to the blades to a first configuration to direct fluid from the fluid source to the pitch angle actuator to decrease the pitch angle of the blades and increase the rotational speed towards the reference rotational speed, and further wherein the commanding the actuator to hold the pitch angle of the blades comprises commanding the flow regulator to a second configuration to block fluid from flowing between the fluid source and the pitch angle actuator and from being diverted away from the pitch angle actuator along a drain line extending from the flow regulator and located downstream thereof.

In some embodiments, the flow regulator is commanded to the first configuration in which a first port of the flow regulator is fluidly connected to the fluid source to receive a fluid flow therefrom, a second port of the flow regulator is fluidly connected to the pitch angle actuator to direct the fluid flow thereto, and a third port of the flow regulator is fluidly disconnected from the drain line to prevent the fluid flow from being diverted away from the pitch angle actuator to the drain line via the second port and the third port, the fluid source located upstream of the flow regulator and the pitch angle actuator located downstream of the flow regulator, and the flow regulator is commanded to the second configuration in which the first port is fluidly disconnected from the fluid source, the second port is fluidly connected to the pitch angle actuator, and the third port is fluidly disconnected from the drain line to prevent fluid from flowing from the fluid source to the pitch angle actuator or from the pitch angle actuator to the fluid source via the first port and the second port, and from flowing from the pitch angle actuator to the drain line via the second port and the third port.

In some embodiments, the commanding the flow regulator to the first configuration comprises causing a displacement member provided within a housing of the flow regulator to expose the first port and the second port and block the third port, the first port, the second port, and the third port each formed as an opening in the housing, and further wherein the commanding the flow regulator to the second configuration comprises causing the displacement member to expose the second port and block the first port and the third port.

In some embodiments, the method further comprises determining one or both of a period of time during which the rotational speed is below the reference rotational speed and a period of time during which the pitch angle is above the pitch angle threshold, comparing the period of time to a pre-determined duration, and commanding the actuator to hold the pitch angle of the blades in response to determining that the period of time exceeds the pre-determined duration.

In some embodiments, the one or both of determining that the rotational speed has failed to increase towards the reference rotational speed and determining that the pitch angle has failed to decrease is performed on a first controller channel or on the first controller channel and a second controller channel.

In some embodiments, the actuator is commanded to hold the pitch angle until the aircraft lands.

In some embodiments, the method further comprises, after the commanding the actuator to hold the pitch angle, causing a power of the engine to be adjusted to bring the rotational speed to the reference rotational speed.

In some embodiments, the commanding the actuator to decrease the pitch angle comprises commanding a first actuator operatively connected to the blades to decrease the pitch angle, and further wherein the commanding the actuator to hold the pitch angle comprises commanding a second actuator operatively connected to the blades to hold the pitch angle, the first actuator configured to modulate the pitch angle and the second actuator configured to selectively arrest pitch angle modulation.

In another aspect, there is provided a system for detecting and mitigating a failure condition of a propeller driven by an engine of an aircraft, the propeller having a plurality of variable pitch propeller blades, the system comprising a processing unit, and a non-transitory computer readable medium having stored thereon program code executable by the processing unit for obtaining one or both of an actual value of a rotational speed of the propeller and an actual value of a pitch angle of the blades, in response to one or both of determining, based on the actual value of the rotational speed, that the rotational speed is below a reference rotational speed for the propeller and determining, based on the actual value of the pitch angle, that the pitch angle is above a pitch angle threshold, commanding an actuator operatively connected to the blades to decrease the pitch angle to increase the rotational speed towards the reference rotational speed, obtaining, after the commanding of the actuator to decrease the pitch angle, one or both of a subsequent value of the rotational speed and a subsequent value of the pitch angle, and commanding the actuator to hold the pitch angle in response to one or both of determining, based on the subsequent value of the rotational speed, that the rotational speed has failed to increase towards the reference rotational speed and determining, based on the subsequent value of the pitch angle, that the pitch angle has failed to decrease.

In some embodiments, the actuator includes one of or a combination of: an electrical actuator and a hydraulic actuator.

In some embodiments, the program code is executable by the processing unit for commanding a flow regulator located between a fluid source and a pitch angle actuator operatively connected to the blades to a first configuration to direct fluid from the fluid source to the pitch angle actuator to decrease the pitch angle of the blades and increase the rotational speed towards the reference rotational speed, and further wherein the program code is executable by the processing unit for commanding the flow regulator to a second configuration to block fluid from flowing between the fluid source and the pitch angle actuator and from being diverted away from the pitch angle actuator along a drain line extending from the flow regulator and located downstream of to hold the pitch angle of the blades.

In some embodiments, the program code is executable by the processing unit for commanding the flow regulator to the first configuration in which a first port of the flow regulator is fluidly connected to the fluid source to receive a fluid flow therefrom, a second port of the flow regulator is fluidly connected to the pitch angle actuator to direct the fluid flow thereto, and a third port of the flow regulator is fluidly disconnected from the drain line to prevent the fluid flow from being diverted away from the pitch angle actuator to the drain line via the second port and the third port, the fluid source located upstream of the flow regulator and the pitch angle actuator located downstream of the flow regulator, and commanding the flow regulator to the second configuration in which the first port is fluidly disconnected from the fluid source, the second port is fluidly connected to the pitch angle actuator, and the third port is fluidly disconnected from the drain line to prevent fluid from flowing from the fluid source to the pitch angle actuator or from the pitch angle actuator to the fluid source via the first port and the second port, and from flowing from the pitch angle actuator to the drain line via the second port and the third port.

In some embodiments, the program code is executable by the processing unit for when the actual value is below the reference rotational speed, commanding the flow regulator to the first configuration comprising causing a displacement member provided within a housing of the flow regulator to expose the first port and the second port and block the third port, the first port, the second port, and the third port each formed as an opening in the housing, and in response to determining that the rotational speed has failed to increase towards the reference rotational speed, commanding the flow regulator to the second configuration comprising causing the displacement member to expose the second port and block the first port and the third port.

In some embodiments, the program code is executable by the processing unit for determining one or both of a period of time during which the rotational speed is below the reference rotational speed and a period of time during which the pitch angle is above the pitch angle threshold, comparing the period of time to a pre-determined duration, and commanding the actuator to hold the pitch angle of the blades in response to determining that the period of time exceeds the pre-determined duration.

In some embodiments, the program code is executable by the processing unit for the one or both of determining that the rotational speed has failed to increase towards the reference rotational speed and determining that the pitch angle has failed to decrease on a first controller channel or on the first controller channel and a second controller channel.

In some embodiments, the program code is executable by the processing unit for commanding the actuator to hold the pitch angle until the aircraft lands.

In some embodiments, the program code is executable by the processing unit for, after the commanding the actuator to hold the pitch angle, causing a power of the engine to be adjusted to bring the rotational speed to the reference rotational speed.

In some embodiments, the actuator comprises a first actuator configured to modulate the pitch angle and a second actuator configured to selectively arrest pitch angle modulation, and further wherein the program code is executable by the processing unit for commanding the first actuator to decrease the pitch angle in response to the one or both of determining that the rotational speed is below a reference rotational speed for the propeller and determining that the pitch angle is above a pitch angle threshold, and for commanding the second actuator to hold the pitch angle in response to the one or both of determining that the rotational speed has failed to increase towards the reference rotational speed and determining that the pitch angle has failed to decrease.

DESCRIPTION OF THE DRAWINGS

Reference is now made to the accompanying figures in which:

FIG. 2A is a schematic diagram illustrating an example control assembly for the engine and propeller of FIG. 1;

FIG. 2B is a schematic diagram illustrating an example propeller control unit (PCU) for the control assembly of FIG. 1;

FIG. 2C is a schematic diagram illustrating another example propeller control unit (PCU) for the control assembly of FIG. 1;

FIG. 3A is a schematic diagram illustrating an example flow regulator of the propeller control unit of FIG. 2B, in a fluid supply configuration;

FIG. 5A, 5B, FIG. 5C, and FIG. 5D are flowcharts of an example method for detecting and mitigating a failure condition of a propeller; and FIG. 6 is a block diagram of an example computing device.

It will be noted that throughout the appended drawings, like features are identified by like reference numerals.

DETAILED DESCRIPTION

Figure 1:
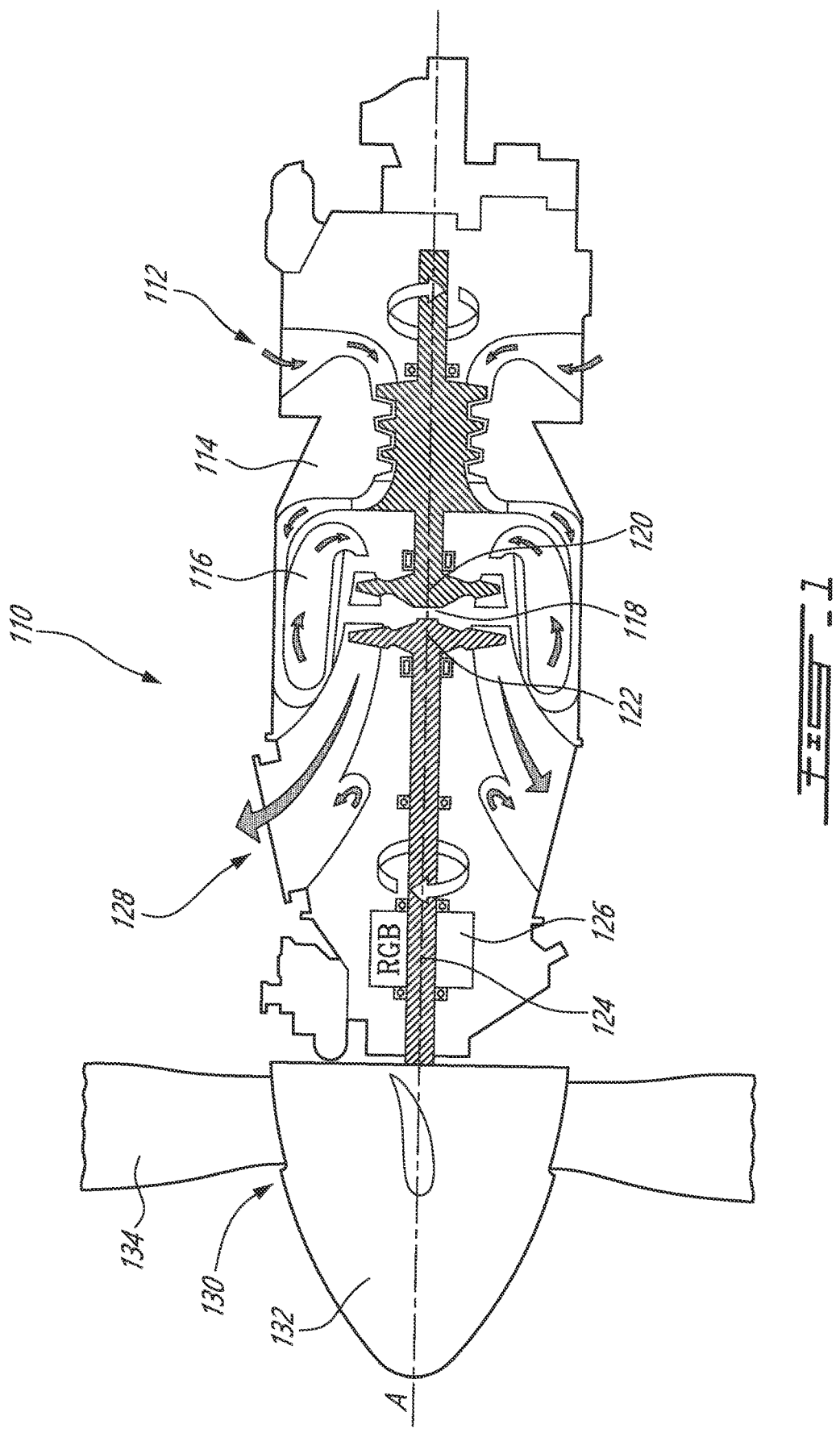
FIG. 1 is a schematic of an example gas turbine engine and propeller.

FIG. 1 illustrates a gas turbine engine 110 of a type typically provided for use in subsonic flight. In this embodiment, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and is coupled with a reduction gearbox (RGB) 126. The power turbine 122 rotatingly drives a rotor shaft (also referred to herein as a propeller shaft or an output shaft) 124 about a propeller shaft axis 'A' through the RGB 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes through a plurality of adjustable blade angles. As used herein, the term "blade angle" (also referred to as "pitch angle" or "pitch") refers to the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full (or maximum) reverse, and forward thrust. The pitch angles can be changed, to achieve a given mode of operation. Depending on the mode of operation, the pitch angle may be positive or negative: the feather and forward thrust modes are associated with positive pitch angles, and the full reverse mode is associated with negative pitch angles.

The propeller 130 converts rotary motion from the engine 110 to provide propulsive force to the aircraft (also referred to herein as thrust). In one embodiment, the propeller 130 is a constant speed variable pitch propeller, meaning that the propeller 130 is designed to have its pitch angle automatically changed to allow the propeller 130 to maintain a constant rotational speed (also referred to herein as a "reference speed"), regardless of the amount of engine torque being produced, the speed of the aircraft, or the altitude at which the aircraft is flying. Other configurations for a turboprop engine may also apply.

Although the examples illustrated herein show a turboprop engine, the methods and systems described herein may be applied to other propeller-based engines, such as piston engines, electrical engines, and the like. The engine 110 may also be any suitable aircraft propulsion system, and may include in some embodiments an all-electric propulsion system or a hybrid-electric propulsion system having a propeller driven in a hybrid architecture (series, parallel, or series/parallel) or turboelectric architecture (turboelectric or partial turboelectric). In addition, the engine 110 may be found in aircraft as well as in other industrial applications, including, but not limited to, wind power turbines and ship propulsion and gas or electrical power generators. The methods and systems described herein may be applied to any system that drives a propeller, such as the propeller 130 of FIG. 1, and positions (e.g., by varying supplied fluid pressure to the propeller system or by any other suitable means, such as electrical actuation) the angle of the propeller blades, such as the blades 134 of FIG. 1.

Referring now to FIG. 2A in addition to FIG. 1, there is illustrated an example embodiment of a propeller control assembly 200 for use in controlling a propeller, such as the propeller 130 of FIG. 1, coupled to an engine, such as the exemplary engine 110 depicted in FIG. 1. A controller 202 receives, from one or more sensors 204, one or more input signals (referred to herein as "sensor signal(s)"). The sensor signal(s) may be received by the controller 202 continuously or at predetermined time intervals. In the embodiment illustrated in FIG. 2A, the sensor(s) 204 are shown as being positioned adjacent (or coupled to) the propeller 130. Although not illustrated in FIG. 2A, the sensor(s) 204 may also be coupled to the engine 110. The sensor signal(s) comprise measurements of one or more parameters for use in controlling the engine 110 and/or propeller 130. The sensor signal(s) received from the sensor(s) 204 can be electrical signal(s), digital or analog, or any other suitable type of signal.

The sensor(s) 204 may comprise one or more speed sensors configured to acquire measurement(s) of the actual (or current) value of the rotational speed of the propeller 130. The sensor(s) 204 may also comprise one or more accelerometers configured to acquire measurement(s) of the actual value of the acceleration of the propeller 130. The speed and/or acceleration measurement(s) acquired by the sensor(s) 204 are then provided to the controller 202. In some embodiments, rather than being directly received at the controller 202 from the sensor(s) 204, the propeller speed may be calculated based on one or more other engine and/or aircraft parameters measured using the sensor(s) 204.

The sensor(s) 204 may also be configured to measure the actual value of the pitch angle of the propeller 130 and to provide this measurement to the controller 202. The pitch angle may be measured by any suitable means. In some embodiments, the pitch angle may be determined from a blade position that can correspond to a measured propeller position along its longitudinal axis. For example, the pitch angle may be read from the position of the propeller piston (not shown) or from the position of any propeller system component that moves along the longitudinal axis of the propeller (e.g., in response to a supplied fluid pressure to the propeller 130) in a proportional manner that can be translated into a pitch angle.

Based on the sensor signal(s) received from the sensor(s) 204, the controller 202 regulates, via a propeller control unit (PCU) 206, the flow of fluid to the propeller 130 in order to maintain the propeller 130 operating at a reference rotational speed (and/or equivalently within a pitch angle threshold).

The reference speed (and/or the pitch angle threshold) is pre-determined and may be obtained by any suitable means, e.g. retrieved from a database, a memory, or other storage medium to which the controller 202 may be communicatively coupled. The value of the reference speed (and/or pitch angle threshold) may depend on engine and propeller configuration. In one embodiment, the most optimal operating speed for operation of the propeller 130 and of the engine 110 is set as the value of the reference speed.

When the propeller's actual speed deviates from the reference speed (and/or the propeller's actual pitch angle deviates from the pitch angle threshold), as determined by the controller 202 from the received sensor signal(s)), the controller 202 responds by commanding the PCU 206 to achieve a change in the angle of the propeller blades 134. The PCU 206 can have any suitable component, and any suitable arrangement of components, to achieve this functionality. More particularly, the PCU 206 may include different actuators, valves, and other components to adjust the angle of the propeller blades 134.

In the embodiment depicted in FIG. 2B, the PCU 206 comprises an electrical actuator 207, which is operatively connected to the variable pitch propeller blades 134 of the propeller 130 via any suitable mechanism so as to be operable to control the pitch angle of the propeller 130. As used herein, the term "electrical actuator" refers to any suitable actuating system that converts electrical energy supplied thereto, for example by the controller 202, into physical motion of the propeller blades 134. More specifically, the electrical actuator 207 is operable to modify the pitch angle of the blades 134 (i.e. to effect fine and coarse changes in propeller blade 134 pitch) depending on the operating conditions of the aircraft for example and/or in response to input from the pilot(s) via suitable input device(s). The electrical actuator 207 may include, but is not limited to, an electrical effector, such as an electric motor, a solenoid actuator an electrical valve mechanism, and the like. The actuator may also include non-electric actuators, such as a spring, a diaphragm actuator, and the like.

The electrical actuator 207 in this embodiment is operatively connected to the controller 202 to be operable by the controller 202 as described herein. In this embodiment, when the controller 202 determines that the actual speed of the propeller 130 deviates from the reference speed, and/or that the propeller's actual pitch angle deviates from the pitch angle threshold, the controller 202 may command the electrical actuator 207 to change the propeller pitch angle, which in turn controls the rotational speed of the propeller 130. For this purpose, the controller 202 transmits to the electrical actuator 207 of the PCU 206 a signal or command (also referred to herein as a "PCU command"), which may be generated using any suitable means. In the present embodiment, rotational speed of the propeller 130 is set via modulation of an angle of the blades 134 in some operating conditions of the engine and/or aircraft. In such operating conditions, fining (i.e. decreasing) the pitch angle results in a propeller speed increase and coarsing (i.e. increasing) the pitch angle results in a propeller speed decrease. The controller 202 may therefore output the PCU command to cause the electrical actuator 207 to decrease the pitch angle of the blades 134 in order to achieve propeller acceleration.

In another embodiment illustrated in FIG. 2C, when the controller 202 determines that the propeller's actual speed deviates from the reference speed, and/or the propeller's actual pitch angle deviates from the pitch angle threshold, the controller 202 commands the PCU 206 to direct (i.e. supply) fluid under pressure to the propeller system or to release (i.e. remove) fluid from the propeller system. In one embodiment, oil flows through the different components of the engine and/or propeller system to control the pitch angles of the blades 134 of the propeller 130. Any suitable incompressible fluid or any suitable liquid other than oil may be used. For example, any suitable hydraulic fluid may be used.

The change in fluid volume going to the propeller system governs operation of the propeller 130, and more specifically causes a change in propeller pitch angle, which in turn affects the rotational speed of the propeller 130. In the present embodiment, increasing fluid flow (i.e. supplying fluid) to the propeller 130 causes the propeller blades 134 to transfer to a lower pitch angle (i.e. causes the pitch angle of the blades 134 to decrease) such that, when the propeller 130 is operating in a forward (i.e. positive) range of pitch angles, the propeller 130 experiences acceleration (i.e. an increase in rotational speed). By way of another example, decreasing fluid flow to (i.e. draining fluid from) the propeller system causes the propeller blades 134 to transfer to a higher pitch angle so that, when the propeller 130 is operating in a forward (i.e. positive) range of pitch angles, the propeller 130 experiences deceleration (i.e. a decrease in rotational speed).

Still referring to FIG. 2C, upon receipt of the PCU command from the controller 202, the PCU 206 responds by regulating fluid flow to modulate the supply of fluid that is used to modify the angle of the propeller blades 134. In the depicted embodiment, the PCU 206 regulates fluid flow to and from the propeller 130 via a flow regulator 208 and a pitch angle actuator 210 (also referred to as "pitch change actuator" or a "blade angle actuator"). In some embodiments, the pitch angle actuator 210 may be located within a dome (not shown) of the propeller 130. The flow regulator 208 controls the pressure of the fluid supplied to the pitch angle actuator 210.

The flow regulator 208 is controlled by the controller 202 via the PCU command and enables the pitch angle actuator 210 to effect fine and coarse changes in propeller blade 134 pitch. For this purpose, the flow regulator 208 is configured to receive (e.g., through an inlet port thereof, not shown) pressurized fluid that flows from a fluid source (e.g., a source of oil) provided on the aircraft. The expression "source" (or "fluid source") as used herein refers to a location from which fluid (e.g., oil) is drawn. The fluid may come from a dedicated oil pump (external or internal to the PCU 206) providing pressurized fluid to the PCU 206, be extracted from the engine main oil pump, or be derived from any continuous oil flow line within the engine system. In one embodiment, the fluid source is a fixed-displacement pump. Any suitable type of pump may be used without departing from the scope of the present disclosure. As will be described further below, adjusting the configuration of the flow regulator 208 selectively allows or prevents fluid flow to or from the pitch angle actuator 210 and controls the pressure of the fluid delivered to the pitch angle actuator 210.

In one embodiment, the flow regulator 208 comprises an Electrohydraulic Servo Valve (EHSV) and the controller 202 is configured to output to the flow regulator 208 a PCU command that determines a governing current of the EHSV. The governing current governs the opening of the EHSV for controlling the flow of fluid from the fluid source to the pitch angle actuator 210. In one embodiment, a positive governing current commands oil supply and a negative governing current commands oil drain. In some embodiments, the controller 202 may be configured to set minimum and maximum governing currents for the EHSV, as well as absolute rates of change of the governing current. While the flow regulator 208 is described herein with reference to an EHSV, the PCU 206 may include any suitable component, and any suitable arrangement of components, for regulating fluid flow to and from the pitch angle actuator 210. In some embodiments, a hydro-mechanical system configured to regulate fluid flow to and from the pitch angle actuator 210 may be used instead of an EHSV.

Any suitable actuating system operable to modulate fluid flow to a desired outflow may be used to regulate fluid flow within the propeller system. It may be desirable for the flow regulator 208 to be operable to supply or drain the entirety or any portion of the received fluid flow. Possible modulating systems include, but are not limited to, electrically-controlled oil pumping systems and electrically-controlled fluid drain control systems. In some embodiments, the flow regulator 208 may be a mechanical pump which, depending on its drive, provides more or less fluid flow to the propeller system. Alternatively, a set of mechanical valves, which may be operable to bypass (e.g., into an inlet of the PCU oil pump) a received fluid flow in order to achieve a desired fluid outflow for maintaining the propeller 130 at the reference speed (or at a desired propeller pitch angle), may be used.

When the controller 202 detects (e.g., based on the sensor signal(s) received from the sensor(s) 204) that the rotational speed of the propeller 130 has dropped below the reference speed (a condition referred to as "underspeed") and/or that the pitch angle of the propeller 130 has increased above the pitch angle threshold, the controller 202 attempts to compensate for (i.e. mitigate) the detected condition by outputting to the PCU 206 the PCU command for causing the propeller pitch angle to decrease (towards the pitch angle threshold), and the propeller speed to increase towards the reference speed. More particularly, in the embodiment depicted in FIG. 2B, the PCU command is output by the controller 202 to cause the electrical actuator 207 to lower the propeller pitch angle in order to increase the rotational speed of the propeller 130. In the embodiment depicted in FIG. 2C, the controller 202 outputs the PCU command to cause the inlet port of the flow regulator 208 to open in order for fluid from the fluid source to be supplied to the flow regulator 208. The fluid is then circulated from the flow regulator 208 to the pitch angle actuator 210 to cause an adjustment of (i.e. decrease in) the propeller pitch angle and an increase in the rotational speed of the propeller 130.

In some embodiments, propeller underspeed (and/or undesired propeller pitch angle increase) may occur when the fluid supplied to the flow regulator 208 is not sufficient to maintain the rotational speed of the propeller 130 at the reference speed. For example, in some embodiments, the fluid source (e.g., the PCU oil pump) may fail and cause low fluid pressure supply to the flow regulator 208 or a complete loss. In other embodiments, the pressure regulating valve (not shown) that regulates fluid pressure delivered from the fluid source (e.g., the PCU oil pump) to the flow regulator 208 may fail in a position that causes low fluid pressure at the inlet to the flow regulator 208. In other embodiments, the main oil pump of the engine 110 that pumps oil pressure to the RGB 124 and to the PCU 206 may fail in supplying oil pressure (e.g., the outflow may be blocked at an oil filter provided on the path to the PCU 206). In yet other embodiments, fluid (e.g., oil) lines, passages in the RGB 124, and/or passages in the PCU 206 may be blocked, leaking or broken, causing a loss or reduction of fluid pressure to the fluid source (e.g., the PCU oil pump). Propeller underspeed (and/or undesired propeller pitch angle increase) may also occur when the drive to the propeller 130 (e.g., engine power) is reduced.

When the controller 202 detects (based on the sensor signal(s)) that propeller underspeed (and/or pitch angle increase) is persisting (e.g., that the rotational speed of the propeller 130 remains below the reference speed and/or the pitch angle of the propeller remains above the pitch angle threshold for a predefined time) or progressing (e.g., that the rotational speed of the propeller 130 has failed to increase and has decreased further below the reference speed, and/or that the propeller pitch angle has failed to decrease and has increased further), the controller 202 responds by attempting to achieve propeller transition towards lower angles (e.g., towards zero degrees) in order to accelerate the propeller 130 to the reference speed.

In some embodiments, the controller 202 is configured to control the engine 110 that drives the propeller 130 and propeller acceleration may be achieved by increasing engine drive upon the controller 202 detecting persisting propeller underspeed. Increasing engine drive may in turn create thrust (provided the propeller 130 is not in the feather position), which allows for adjustment of the propeller speed. The increase in engine drive may occur automatically or in response to pilot input (e.g., upon the pilot modulating the Power Lever Angle). In other embodiments (as depicted in FIG. 2B), the controller 202 operates in regimes in which propeller acceleration may be achieved by decreasing the propeller pitch angle (and propeller deceleration may be achieved by increasing the propeller pitch angle) through a command to the electrical actuator 207. In this embodiment, upon detecting persisting propeller underspeed (and/or persisting propeller pitch angle increase), the controller 202 adjusts the PCU command to cause the electrical actuator 207 to further decrease the propeller pitch angle to increase the propeller speed (towards the reference speed). In yet other embodiments (as depicted in FIG. 2C), the controller 202 operates in regimes in which propeller acceleration may be achieved by decreasing the propeller pitch angle through a commanded supply of fluid to the propeller system, and in which propeller deceleration may be achieved by increasing the propeller pitch angle through a commanded drain of fluid from propeller system. In this embodiment, upon detecting persisting propeller underspeed (and/or persisting propeller pitch angle increase), the controller 202 adjusts the PCU command to further increase the degree of opening of the flow regulator 208 (for more fluid pressure supply to the propeller system) to achieve the propeller transition towards lower pitch angle and thus further increase the rotational speed of the propeller 130.

However, if the supply of fluid (from the fluid source) to the flow regulator 208 is lost (i.e. absent) or the fluid pressure is insufficient to be delivered to the flow regulator 208 (e.g., due to a failure of the fluid source, broken fluid line(s), fluid leakage along the fluid line(s), or the like, as described herein above), the more the flow regulator 208 opens in order for fluid pressure to be delivered thereto from the fluid source, the more fluid is drained through the opened inlet port of the flow regulator 208. This is due to the fact that the opened inlet port, being deprived of a supply of fluid from the fluid source (or receiving an insufficient fluid pressure), creates a path for fluid drainage. This fluid drainage in turn prevents the propeller 130 from increasing its rotational speed to the reference speed and causes the rotational speed of the propeller 130 to continue to drop (despite the flow regulator 208 being commanded to open to increase fluid supply). This may lead the propeller pitch angle to increase to a point where the propeller 130 may be inadvertently transitioned towards a feather position (i.e. the propeller pitch angle has increased to substantially ninety degrees), which may increase the amount of torque produced by the propeller 130 and negatively impact flight safety and aircraft operational cost.

As will be described further below, proposed herein are systems and methods for detecting that propeller underspeed (and/or pitch angle increase) is progressing, despite the PCU 206 having been commanded to cause an increase in the rotational speed (and/or a decrease in the pitch angle) of the propeller 130. In one embodiment, the propeller underspeed (and/or pitch angle increase) condition may be due to a failure condition of the propeller system in which fluid supply to the PCU 206 (particularly to the flow regulator 208) is lost (or fluid pressure to the PCU 206 is insufficient). Proposed herein are also systems and methods for mitigating the propeller underspeed (and/or pitch angle increase) condition. In one embodiment, the mitigation procedure comprises commanding an actuator operatively connected to the blades 134 to hold the propeller pitch angle (i.e. arrest pitch angle modulation). In some embodiments, the actuator is commanded to hold the propeller pitch angle until the aircraft lands.

In one embodiment, the actuator is the electrical actuator 207 of FIG. 2B which is actuated (via the PCU command) to cause an arrest in the propeller pitch angle. The electrical actuator 207 may comprise any suitable gearing and/or solenoid that, upon detection of the inability of the main electrical system to decrease the propeller pitch angle and/or increase the propeller speed, falls into a state in which a mechanical latch, stopper, or any other suitable mechanism engages and arrests the propeller pitch angle in the position that the pitch angle was in at the last point in time in which the electrical system was operable. In another embodiment, the actuator is the pitch angle actuator 210 of FIG. 2C, which is coupled to the flow regulator 208. In this embodiment, the mitigation procedure comprises commanding the flow regulator 208 to a configuration in which fluid flow (referred to herein as "upstream fluid flow") is prevented from being supplied from a fluid source to the pitch angle actuator 210 via the flow regulator 208 and in which fluid flow (referred to herein as "downstream fluid flow") is prevented from being diverted away from the pitch angle actuator 210 via the flow regulator 208. In this manner, the fluid pressure in the fluid line connecting the propeller 130 and the pitch angle actuator 210 to the flow regulator 208 can be maintained, which in turn prevents the rotational speed of the propeller 130 from further decreasing below the reference speed.

The period of time for which the fluid pressure in the fluid line connecting the propeller 130 and the pitch angle actuator 210 to the flow regulator 208 can be maintained depends on the application and on the configuration of the propeller system. In some embodiments, the propeller system is configured such that there is no fluid leakage at the propeller 130. In this case, commanding the flow regulator 208 to the given configuration in which upstream fluid flow is prevented from being supplied to the pitch angle actuator 210 via the flow regulator 208 and in which downstream fluid flow is prevented from being diverted away from the pitch angle actuator 210 via the flow regulator 208 may allow for the fluid pressure to be maintained as long as the flow regulator 208 is held in the given configuration. However, in some embodiments, fluid from the fluid source 302 may be utilized by the flow regulator 208 to operate. In this case, if fluid supply to the flow regulator 208 is lost (or insufficient) to the point where operation of the flow regulator 208 is affected, the flow regulator 208 will no longer be able to hold in the given configuration.

The flow regulator 208 may therefore, in some embodiments, be designed such that it operates independently from the fluid pressure supplied (e.g., by the fluid source 302) to the PCU 206 or to the flow regulator 208. For example, the flow regulator 208 may utilize an independent source of static fluid (e.g. oil) pressure for its operation, the source of static fluid pressure being independent from the fluid supplied to the flow regulator 208 by the fluid source 302. For instance, the source of static fluid pressure may be an external oil line. In that case, the flow regulator 208 may be maintained in the given configuration for as long as the propeller system maintains pressure. The flow regulator 208 may also be configured to receive current from the controller 202 to achieve the given configuration. In this case, the flow regulator 208 may remain in the given configuration for as long as the electrical drive is supplied. In some embodiments, the fluid pressure may be maintained until the aircraft lands.

While reference is made herein to a main actuator (e.g., the electrical actuator 207 in FIG. 2B or the pitch angle actuator 210 in FIG. 2C) being used to both modulate propeller pitch angle (in normal operation) and selectively arrest propeller pitch angle (upon detection of the inability to decrease propeller pitch angle and/or increase propeller speed), an additional actuator (referred to herein as a pitch angle modulation arrestor 212), independent from the main actuator, may optionally be used for the sole purpose of arresting the propeller pitch angle. In other words, the pitch angle modulation arrestor 212 may be configured to stop further changes in propeller pitch angle (i.e. configured to selectively arrest pitch angle modulation) upon detection of the propeller failure condition (propeller underspeed and/or undesired propeller pitch angle increase). In one embodiment, the pitch angle modulation arrestor 212 is an on-off actuator. The pitch angle modulation arrestor 212 may take any suitable form and may be added to a hydraulic main blade pitch modulation system (as shown in FIG. 2C), a fully electrical main blade pitch modulation system (as shown in FIG. 2B), or a hydro-electrical main blade pitch modulation system (not shown). In other words, the pitch angle modulation arrestor 212 may include, but is not limited to, an electrical actuator and a hydraulic actuator.

In some embodiments, the proposed mitigation procedure may allow to slow down the transition of the propeller 130 towards feather, in turn reducing the torque produced by the propeller 130 during an inadvertent transition towards feather. The systems and methods described herein may therefore prove useful for applications where overtorque conditions (i.e. conditions where the amount of torque acting on the engine 110 driving the propeller system exceeds a predetermined threshold) are undesirable due to their potential impact on flight safety or on aircraft operational cost.

Figure 3B:
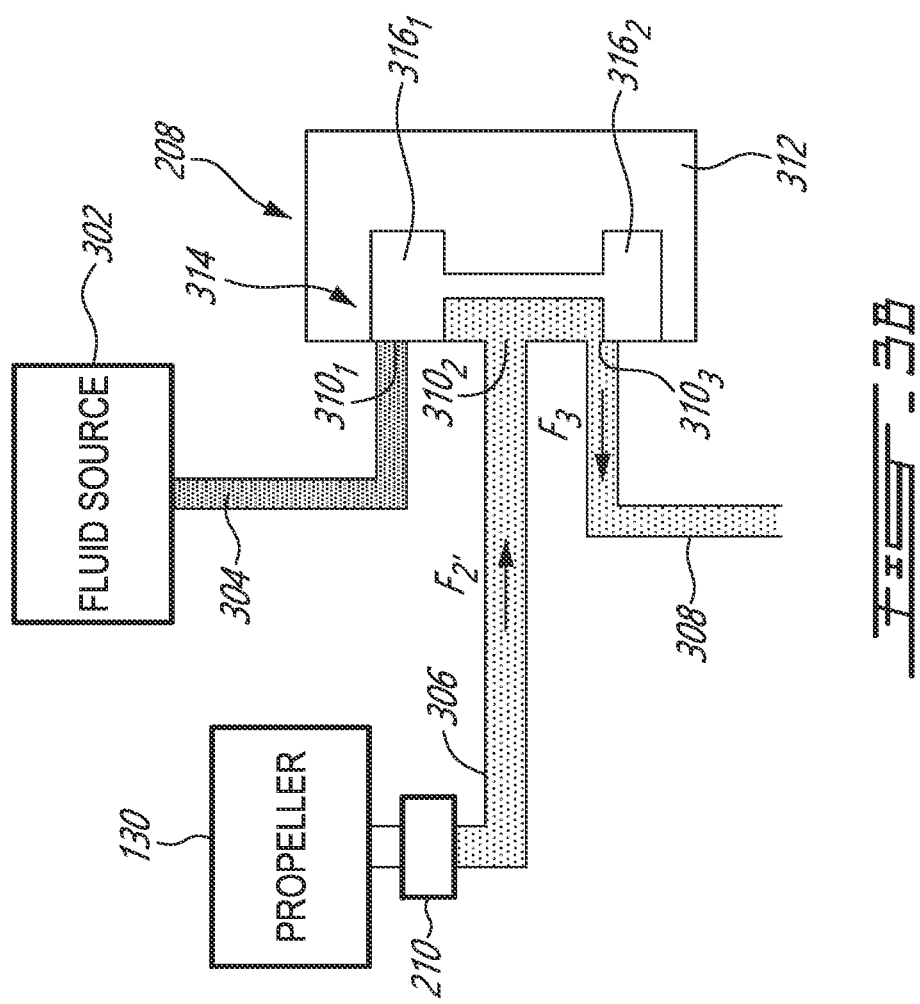
FIG. 3B is a schematic diagram illustrating the example flow regulator of FIG. 3A, in a fluid drainage configuration.
Figure 3C:
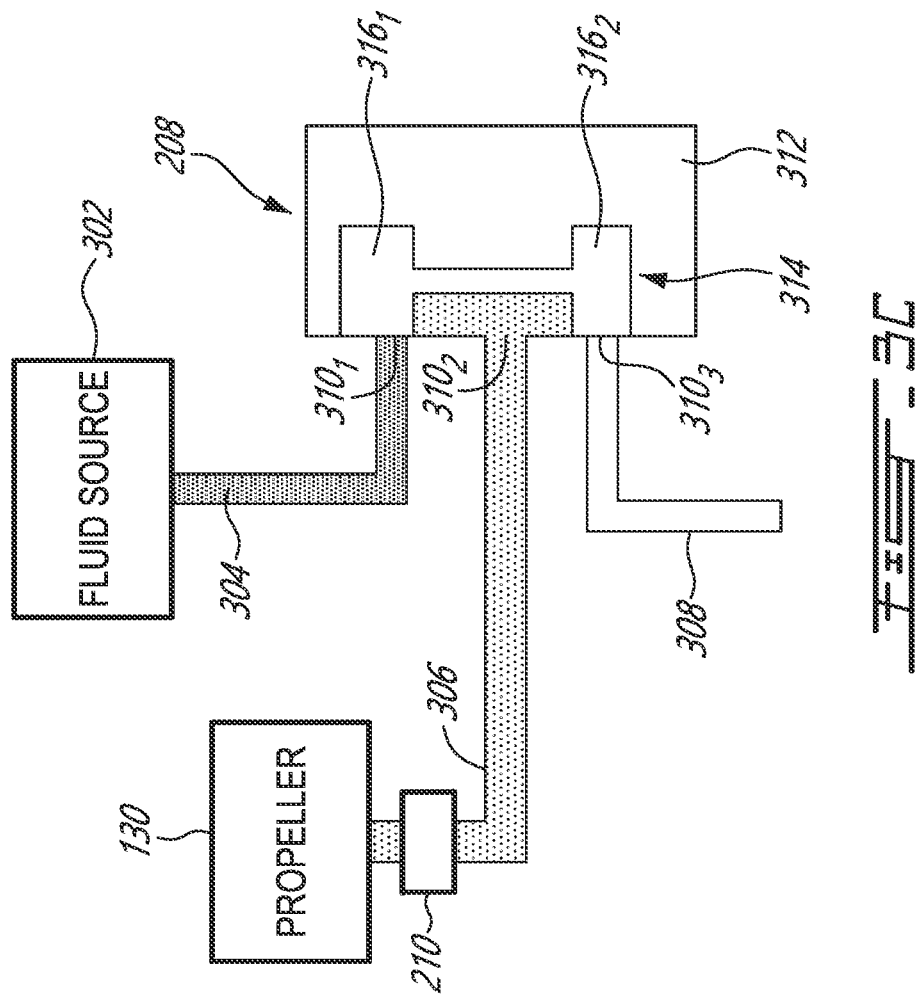
FIG. 3C is a schematic diagram illustrating the example flow regulator of FIG. 3A, in a closed configuration.

FIG. 3A, FIG. 3B, and FIG. 3C illustrate an example flow regulator 208, in accordance with one embodiment. The flow regulator 208 is fluidly connected to a fluid source 302 (e.g., a source of oil) provided on the aircraft through a first fluid line 304. As used herein, the term "fluidly connected" refers to a condition in which two elements are connected to one another in such a way that a fluid flows between the two elements. For example, two elements may be fluidly connected via a fluid line running between them. Conversely, the term "fluidly disconnected" refers to a condition in which two elements are disconnected from one another in such a way that fluid does not flow between the two elements. For example, two elements may be fluidly disconnected if access to the fluid line connecting the two elements is blocked.

In one embodiment, the fluid source 302 is located upstream of the flow regulator 208 and outputs a fluid. In one embodiment, the fluid may be output by the fluid source 302 at a substantially constant rate. In other embodiments, the fluid may be output by the fluid source 302 at a rate that varies or is modulated depending on the effect to be achieved. For example, the fluid may be supplied to the flow regulator 208 (from the fluid source 302) at a first pressure when propeller deceleration is to be achieved, and at a second pressure higher than the first pressure when propeller acceleration is to be achieved. Any suitable system that governs fluid flow from the fluid source 302 into the flow regulator 208 may be used.

The flow regulator 208 is also fluidly connected to the propeller 130 through a second fluid line 306. In one embodiment, the propeller 130 and the pitch angle actuator 210 are located downstream of the flow regulator 208. Other configurations are possible. In order to allow fluid (e.g., excess fluid) to be diverted away from the flow regulator 208, a drainage path is defined by a third fluid line (also referred to as a "drain line") 308, which extend from the flow regulator 208 downstream thereof. As used herein, the term "excess fluid" refers to fluid that is supplied to the flow regulator 208 by the fluid source 302 but that is not required by the flow regulator 208. Excess fluid may be available during steady-state operation of the propeller 130 (e.g. flight idle, ground idle, etc.), when there is no need to change the pitch of the propeller blades (reference 134 in FIG. 1). As will be described further below, the drainage path defined by the third fluid line 308 may send the excess fluid back to an inlet of the fluid source 302 or to any other suitable drain location.

The fluid lines 304, 306, and 308 may be positioned at any suitable distance from one another and may encompass any hose, tube, pipe, passage, channel, conduit, or any other structure able to flow a fluid and to fluidly connect two elements to one another. The first fluid line 304 runs from an outlet (not shown) of the fluid source 302 to a first port $310_1$ of the flow regulator 208, such that the first port $310_1$ is at one extremity of the first fluid line 304 and the outlet of the fluid source 302 is at the other extremity of the first fluid line 304. The second fluid line 306 runs from a second port $310_2$ of the flow regulator 208 to the pitch angle actuator 210 (and the propeller 130), such that the second port $310_2$ is at one extremity of the second fluid line 306 and the pitch angle actuator 210 is at the other extremity of the second fluid line 306. The third fluid line 308 runs from a third port $310_3$ of the flow regulator 208 to any suitable drain location in the engine system, such as an inlet (not shown) of the fluid source 302, the Reduction Gearbox (RGB) (reference 126 in FIG. 1), an accessory gearbox (AGB), not shown), a main oil tank, an auxiliary oil tank (not shown), or the like, such that the third port $310_3$ is at one extremity of the third fluid line 308 which has the drain location at its other extremity. As will be discussed further below, the first port $310_1$ of the flow regulator 208 may serve as an inlet port (through which a flow of fluid is received), the third port $310_3$ of the flow regulator 208 may serve as an outlet port (through which a flow of fluid is expelled or drained), and the second port $310_2$ of the flow regulator 208 may serve as either an inlet aperture or an outlet aperture. The ports $310_1$, $310_2$, and $310_3$ are each formed as an opening or aperture in a housing 312 of the flow regulator 208 and are in fluid communication with an interior of the housing 312. In the illustrated embodiment, the ports $310_1$, $310_2$, and $310_3$ are positioned in a spaced relationship along a side surface (not shown) of the housing 312. The positioning of the ports may vary depending on engine configuration.

As will be described further below, in one embodiment, it is proposed herein for the flow regulator 208 to be operated between a plurality of configurations in which fluid flow is selectively allowed or blocked along the first fluid line 304, the second fluid line 306, and the drainage path defined by the third fluid line 308. In one embodiment, the flow regulator 208 comprises a displacement member (or body) 314 that is displaceable within the housing 312. The displacement member 314 is configured for upward and downward movement (along the direction of arrow B) within the housing 312. The displacement member 314 may comprise at a first (or upper) end (not shown) thereof a first land $316_1$ and a second land $316_2$ at a second (or lower) end (not shown) thereof opposite the first end. Each land $316_1$, $316_2$ is configured to abut against the side surface of the housing 312 in which the ports $310_1$, $310_2$, $310_3$ are formed, for selectively blocking (i.e. closing) or exposing (i.e. opening) the ports $310_1$ and $310_3$. In some embodiments, the displacement member 314 may be configured to block or expose the ports $310_1$ and $310_3$ either partially or fully for controlling the pressure of the fluid flowing into and out of the flow regulator 208. While, in the depicted embodiment, the displacement member 314 is configured to leave the port $310_2$ exposed, the displacement member 314 may, in other embodiments, be configured to block the port $310_2$.

In some embodiments, the flow regulator 208 may further comprise an upper stop (not shown) that engages the first end of the displacement member 314 (i.e. the first land $316_1$) to limit upward movement of the displacement member 314, and a lower stop (not shown) that engages the second end of the displacement member 314 (i.e. the second land $316_2$) to limit downward movement of the displacement member 314. In another embodiment, the flow regulator 208 may be configured such that the displacement member 314 is displaceable upwardly up to an upper surface (not shown) of the housing 312 and downwardly up to a lower surface (not shown) of the housing 312. The full stroke range motion of the displacement member 314 (i.e. the range of motion from the highest point to the lowest point that the displacement member 314 can reach) may vary depending on the configuration of the flow regulator 208.

FIG. 3A shows the flow regulator 208 in a first configuration (also referred to herein as an "open" or "fluid supply" configuration) in which the flow regulator 208 delivers fluid pressure to the pitch angle actuator 210. In the configuration shown in FIG. 3A, the flow regulator 208 allows access to lines 304 and 306 (i.e. fluidly connects the flow regulator 208, and the pitch angle actuator 210, to the fluid source 302) by positioning the land $316_1$ away from (i.e. exposing) the first port $310_1$, with port $310_2$ remaining exposed. In this manner, the first port $310_1$ is in fluid communication with an outlet (not shown) of the fluid source 302 via line 304 and the second port $310_2$ is in fluid communication with line 306. An upstream fluid flow (arrow $F_1$) from the fluid source 302 is directed along line 304 and into the housing 312 of the flow regulator 208 through the first port $310_1$, and a downstream fluid flow (arrow $F_2$) is expelled from the flow regulator 208 through the second port $310_2$ and directed along line 306 to the pitch angle actuator 210. When the flow regulator 208 is in the configuration shown in FIG. 3A, in order to prevent fluid flow from being diverted away from the pitch angle actuator 210 along the drainage path defined by line 308, the land $316_2$ is abutted against (i.e. blocks) the third port $310_3$ for blocking access to (i.e. closing) line 308 (i.e. fluidly disconnecting the flow regulator 208, and the pitch angle actuator 210, from the drain line 308). In this manner, the upstream fluid flow supplied by the fluid source 302 is made available to the pitch angle actuator 210 via the flow regulator 208 for making the required changes in propeller blade 134 pitch.

FIG. 3B shows the flow regulator 208 in a second configuration (also referred to herein as a "fluid drainage" configuration) in which the flow regulator 208 drains fluid from the propeller system. The flow regulator 208 may be moved to the configuration shown in FIG. 3B and the fluid may be drained from the propeller system in order to bring the propeller 130 in a feathering (or feather) position. In the event of a malfunction (e.g., flameout) of the engine (reference 110 in FIG. 1) and/or a malfunction of the flow regulator 208, it may indeed be required to bring the propeller blades (reference 134 in FIG. 1) in the feathering position for safety purposes. The fluid contained in the housing 312 of the flow regulator 208 may therefore have to be expelled out of the housing 312 to be able to bring the blades 134 in the feathering position. The feathering position of the blades 134 corresponds to a position in which an angle of attack defined between the blades 134 and an incoming flow is such that there is no lifting force created by the incoming flow on the blades 134. In other words, when the blades 134 are in a feathering position, the blades 134 offer a reduced or minimum drag to the incoming flow and are in a position that may not result in the incoming flow inducing rotation of the propeller 130. The feathering position is typically used where there is an engine shutdown when the aircraft is flying. Having the blades 134 in the feathering position may prevent the incoming flow from creating a wind-milling effect of the propeller 134 which might damage the engine 110 when the engine 110 is not operational. In one embodiment, when the blades 134 are in the full feathering position, the propeller pitch angle is substantially ninety (90) degrees.

In the configuration shown in FIG. 3B, the land $316_1$ abuts against (i.e. blocks) the first port $310_1$ for blocking access to line 304 and the land $316_2$ is positioned away from (i.e. exposes) the third port $310_3$ for allowing access to fluid line 308, with access to fluid line 306 remaining available (i.e. with port $310_2$ remaining exposed). In this manner, the upstream fluid flow (from the fluid source 302) is prevented from being directed along line 304 and into the flow regulator 208 through the first port $310_1$. Because the second port $310_2$ is in fluid communication with line 306 and the third port $310_3$ is in fluid communication with line 308, the downstream fluid flow from the propeller 130 and the pitch angle actuator 210 is circulated along line 306 (arrow $F_2$) into the second port $310_2$ of the flow regulator 208, and drained from the flow regulator 208 (through the third port $310_3$) along the drainage path defined by line 308 (arrow $F_3$). The drained fluid may be circulated to any suitable drainage location, as described above. The fluid line 308 thus provides a path to drain (i.e. remove) fluid from the pitch angle actuator 210 for increasing the propeller pitch angle. This may be required for propeller deceleration or performing propeller feather in normal propeller operation (e.g. accompanying an engine shutdown), or as a reaction of the controller (reference 202 in FIG. 2A) to a detected propeller overspeed condition (i.e. a condition in which the rotational speed of the propeller exceeds the reference speed) or to a detected unexpected propeller transition below the pitch angle threshold.

FIG. 3C shows the flow regulator 208 in a further configuration (referred to herein as a "closed" configuration). The flow regulator 208 may be actuated to the configuration of FIG. 3C upon the controller (reference 202 in FIG. 2A) detecting that propeller underspeed (and/or propeller pitch angle increase) is persisting despite the flow regulator 208 having been commanded to open for increasing fluid supply to the pitch angle actuator 210, as will be discussed further below. In the configuration shown in FIG. 3C, the flow regulator 208 blocks access to lines 304 and 308 (i.e. fluidly disconnects the flow regulator 208, and the pitch angle actuator 210, from the fluid source 302 and the drain line 308) by abutting the land $316_1$ against (i.e. blocking) the first port $310_1$ and abutting the land $316_2$ against (i.e. blocking) the third port $310_3$, while port $310_2$ remains exposed and in fluid communication with fluid line 306. Fluid from the fluid source 302 (i.e. the upstream fluid flow) is thus prevented from being directed along line 304 into the flow regulator 208 through the first port $310_1$, and fluid (i.e. the downstream fluid flow) is prevented from being drained (through the third port $310_3$) via the drainage path defined by line 308. The upstream fluid flow from the fluid source 302 is therefore prevented from being supplied to the pitch angle actuator 210 via the flow regulator 208 and the downstream fluid flow is prevented from being diverted away from the pitch angle actuator 210 via the flow regulator 208. The fluid pressure in the fluid line 306 connecting the pitch angle actuator 210 to the flow regulator 208 can therefore be maintained, which prevents the rotational speed of the propeller 130 from further decreasing below the reference speed. The transition of the propeller 130 towards the feather position may therefore be slowed down, which may reduce the amount of torque produced by the propeller 130.

In some embodiments, the controller 202 may be configured such that the logic for holding the flow regulator 208 at the closed configuration of FIG. 3C is overridden upon detection of engine flameout or shutdown. In this case, even if persisting propeller underspeed (and/or persisting propeller pitch angle increase) is detected, the controller 202 may be configured to move the flow regulator 208 to the drainage configuration of FIG. 3B, in order to feather the propeller 130. Moreover, as described above, the controller 202 may be configured to move the flow regulator 208 to the drainage configuration of FIG. 3B (e.g., from the closed configuration of FIG. 3C) in the event of exceedance of the reference speed (i.e. overspeed).

Figure 3D:
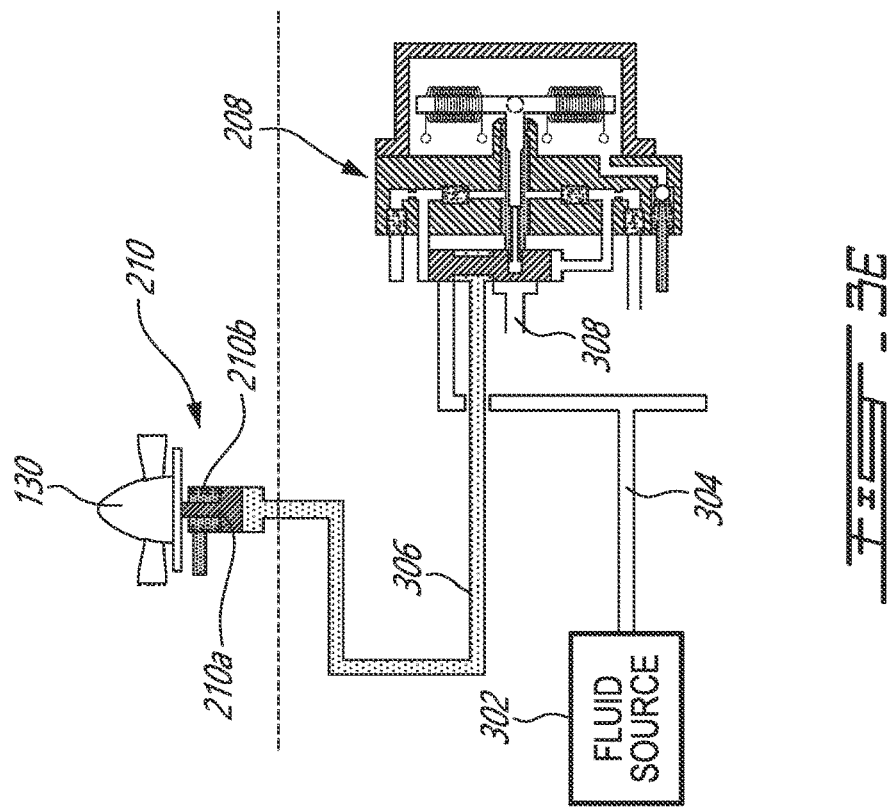
FIG. 3D is a schematic diagram illustrating another example flow regulator of the propeller control unit of FIG. 2B, in a fluid supply configuration.
Figure 3E:
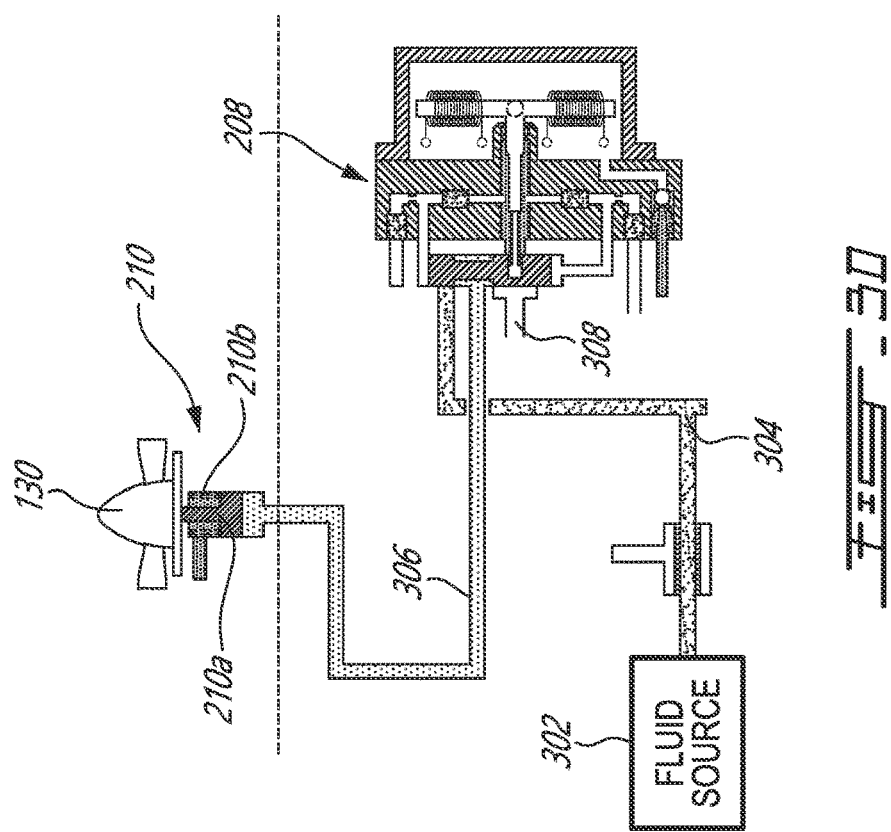
FIG. 3E is a schematic diagram illustrating the example flow regulator of FIG. 3D in a closed configuration.

FIG. 3D and FIG. 3E illustrate another embodiment of the PCU (reference 206 in FIG. 2A). The depicted embodiment illustrates the flow regulator 208 as an EHSV. Such an EHSV is described in Applicant's US patent entitled PROPELLER BLADE ANGLE CONTROL SYSTEM, Ser. No. 10,501,169, filed by David Waddleton on Jun. 17, 2016, which is incorporated by reference herein. In the depicted embodiment, the pitch angle actuator 210 comprises a piston 210a that moves within an actuator cavity 210b of the pitch angle actuator 210. Other configurations may apply and the pitch angle actuator 210 may include any suitable components that cooperate to effect changes in the propeller pitch angle. Changing the quantity of fluid that is contained within the cavity 210b allows the pitch angle actuator 210 to dynamically change the angle of attack of the blades 134. To do so, the flow regulator 208 may vary a flow rate of fluid that is supplied to the actuator cavity 210b via line 306.

Figure 4:
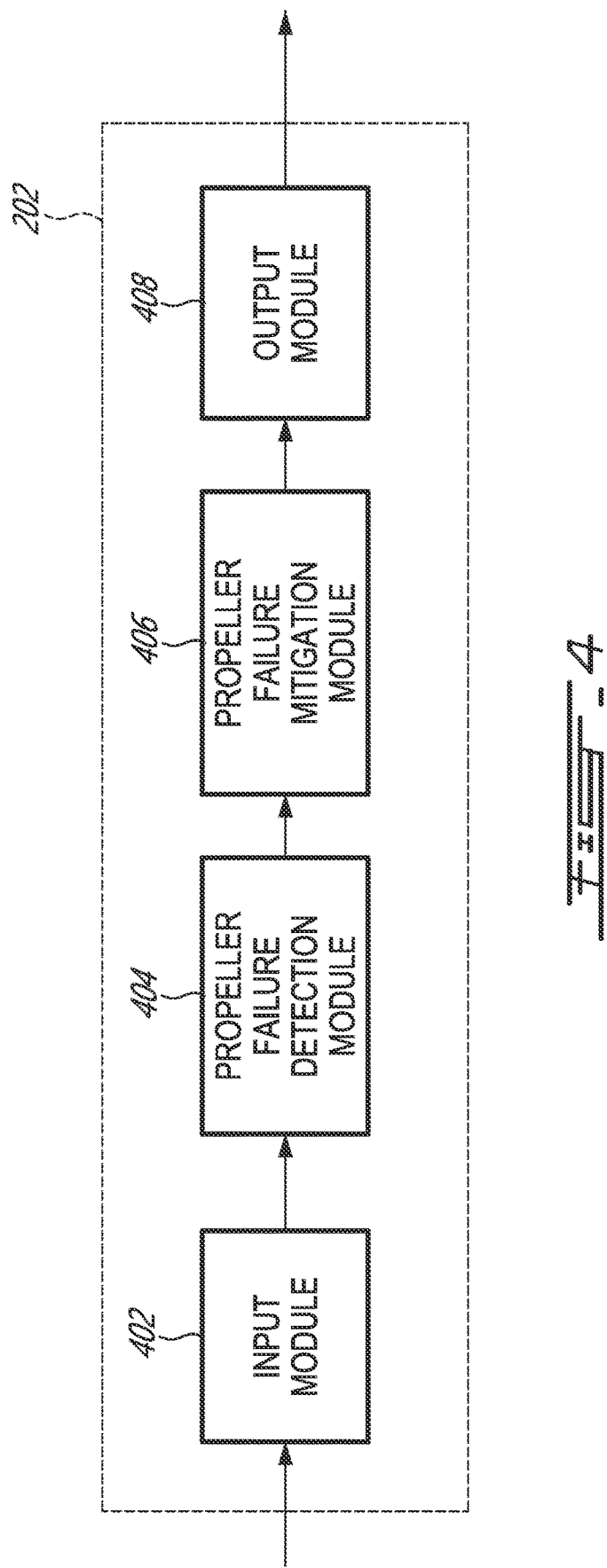
FIG. 4 is a block diagram illustrating an example implementation of the controller of FIG. 2A, FIG. 2B, and FIG. 2C.
Figure 5B:
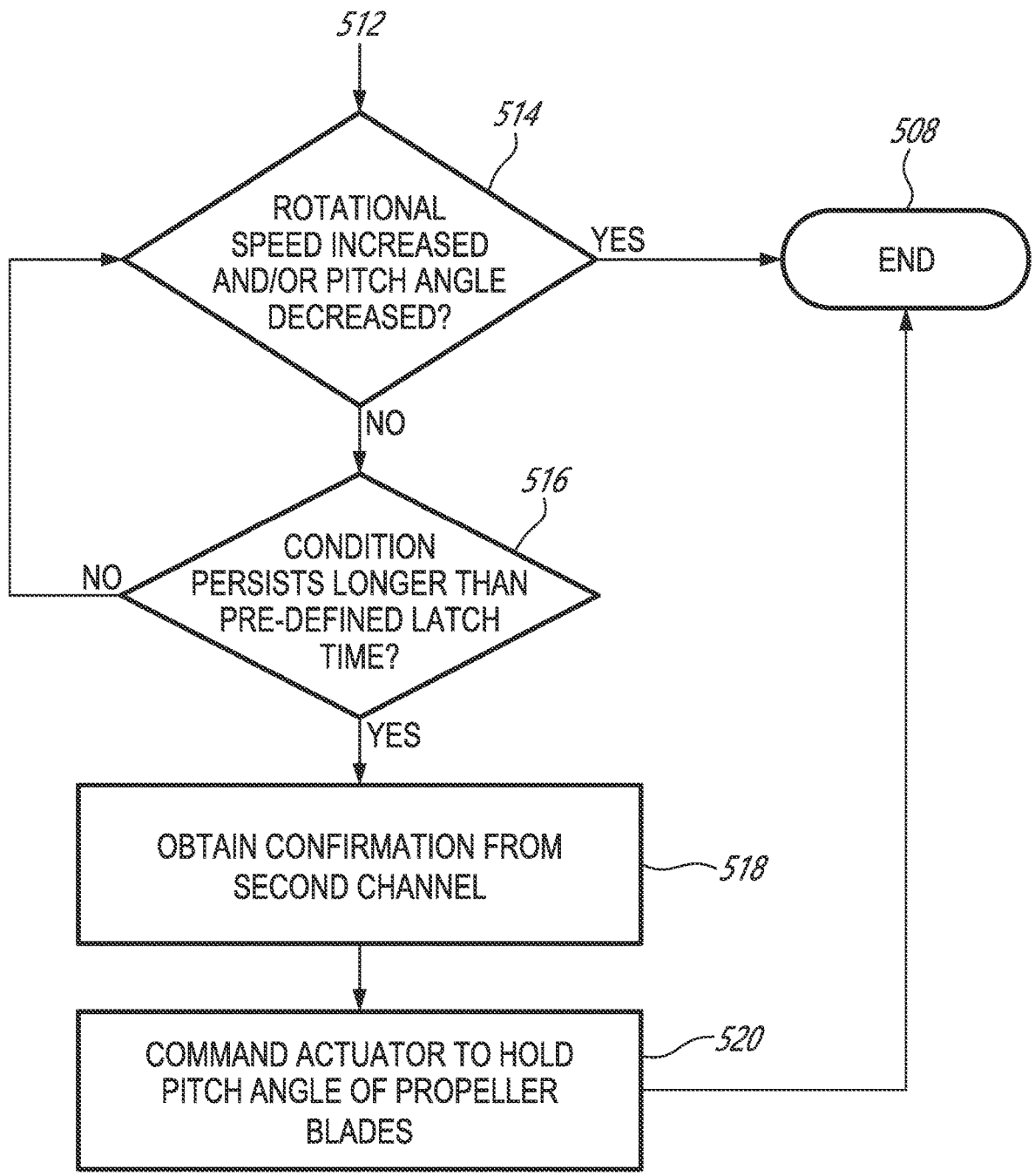
Figure 8:
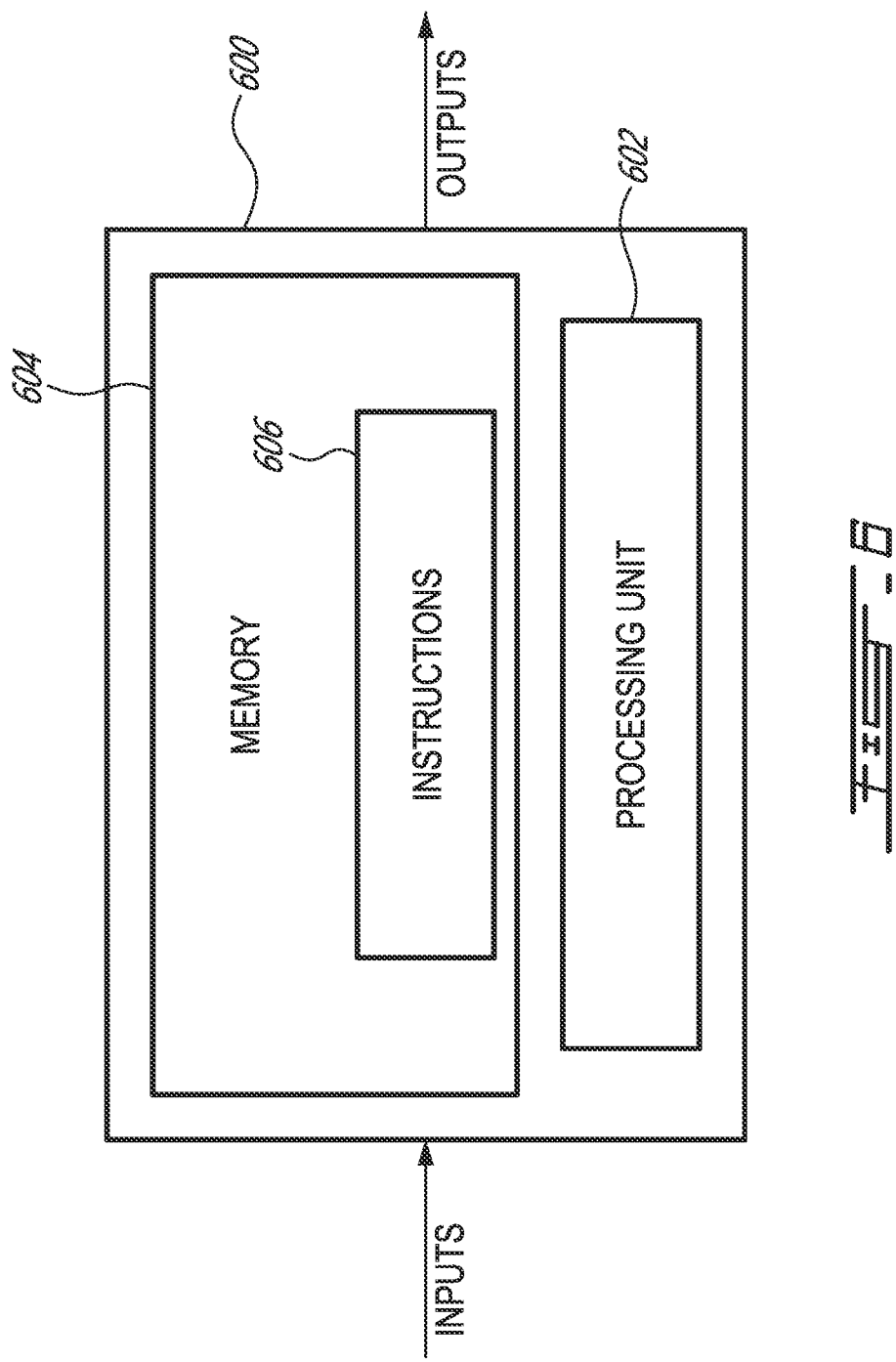

Referring now to FIG. 4, there is illustrated an example embodiment of the controller 202. The controller 202 may be an Engine & Propeller Electronic Control (EPEC) system, an engine controller, such as a Full Authority Digital Engine Control (FADEC), an electronic propeller control system, an Engine Electronic Control (EEC), an Engine Control Unit (ECU), or the like. In the embodiment illustrated in FIG. 4, the controller 202 comprises an input module 402, a propeller failure detection module 404, a propeller failure mitigation module 406, and an output module 408.

The input module 402 receives (continuously or at predetermined time intervals) one or more input signals (or sensor signal(s)) comprising an actual value of the propeller speed and/or the propeller pitch angle as obtained from measurements acquired by the sensor(s) (reference 204 in FIG. 2A). In some embodiments, the input module 402 may be configured to assess (in any suitable manner) whether the sensor signal(s) are healthy, i.e. within range and failure free. The sensor signal(s) are then provided to the propeller failure detection module 404 for processing.

The propeller failure detection module 404 is configured to detect a failure condition of the propeller (reference 130 in FIG. 2A) and when this propeller failure condition is persisting. In one embodiment, the failure condition may be detected by the failure detection module 404 when the propeller 130 is operating at a rotational speed below the reference speed, a condition referred to as underspeed, and when propeller underspeed is persisting. For this purpose, the propeller failure detection module 404 compares the actual value of the propeller speed to the reference speed. The comparison of the actual value of the propeller speed to the reference speed may include comparing the actual value of the rotational speed to the reference speed itself, to a value based thereon (e.g., 95% of the reference speed), to a range of values including the reference speed, and the like. It should be noted that the actual propeller speed may be considered to meet (i.e. be maintained at) the reference speed when a difference between the actual propeller speed and the reference speed is below a predetermined amount, or when the actual propeller speed and the reference speed are within a particular range, or the like.

While reference is made herein to propeller failure being detected based on the actual value of the rotational speed of the propeller, propeller failure may equivalently (or additionally) be detected based on the actual value of the propeller pitch angle. In particular, propeller failure may be detected upon the propeller failure detection module 404 detecting a change in the propeller pitch angle that is contrary to an expected change in response to the PCU command. For example, the PCU command may comprise instructions to cause the propeller pitch angle to decrease (e.g., upon detecting that the propeller 130 is operating at a pitch angle above the pitch angle threshold). The propeller failure detection module 404 may however detect (from the sensor signal(s)) that the propeller pitch angle has failed to decrease (e.g. has increased) in response to the PCU command. This would provide an indication that the propeller failure condition is present.

In this embodiment, in order to detect the propeller failure condition, the propeller failure detection module 404 may compare the actual value of the propeller pitch angle to a propeller pitch angle value obtained in a previous clock cycle. Based on the comparison, the propeller failure detection module 404 may determine whether the expected change (e.g., decrease) in propeller pitch angle has occurred in response to the PCU command. The propeller failure detection module 404 may also compare the actual value of the propeller pitch angle to the pitch angle threshold in order to assess whether the propeller pitch angle has been maintained at the pitch angle threshold. The comparison of the actual value of the propeller pitch angle to another pitch angle value (i.e. the previous pitch angle value and/or to the pitch angle threshold) may include comparing the actual value of the pitch angle to the other pitch angle value itself, to a value based thereon (e.g., 95% of the other pitch angle value), to a range of values including the other pitch angle value, and the like. It should be noted that the actual pitch angle may be considered to meet (i.e. be maintained at) the other pitch angle value (e.g., the pitch angle threshold) when a difference between the actual pitch angle and the other pitch angle value is below a predetermined amount, or when the actual pitch angle and the other pitch angle value are within a particular range, or the like.

If the actual value of the propeller speed is below the reference speed and/or the propeller pitch angle exceeds the pitch angle threshold (e.g., within a predetermined range), the propeller failure detection module 404 detects the propeller failure condition and determines that the propeller speed needs to be increased towards the reference speed and/or the propeller pitch angle needs to be decreased. The propeller failure mitigation module 406 generates (based on the actual value of the propeller speed or on the actual value of the propeller pitch angle obtained from the sensor signal(s)) a PCU command to achieve the decrease in propeller pitch angle, causing an increase in propeller speed (i.e. acceleration of the propeller 130). As described above, the PCU command may be output by the controller 202 (or generated using any suitable means described above) and may comprise instructions to increase the governing current of the flow regulator 208 in order to supply fluid to the pitch angle actuator 210 and transition the propeller blades (reference 134 in FIG. 1) towards lower angles (e.g., close to zero degrees), thus increasing the propeller speed towards the reference speed. In other embodiments, the PCU command may comprise instructions to cause the electrical actuator (reference 207 in FIG. 2B) to modify (i.e. decrease) the angle of the propeller blades 134, thus increasing the propeller speed towards the reference speed. The propeller failure mitigation module 406 may then send the PCU command to the output module 408 for transmission to the electrical actuator 207 or the PCU flow regulator (reference 208 in FIG. 2C), for use in adjusting the propeller pitch angle.

The controller 202 may be configured to continuously monitor the change in propeller speed and/or pitch angle. Sensor signal(s) containing a new value (also referred to as a "subsequent value") of the propeller speed and/or pitch angle may therefore be received at the input module 402, subsequent to the PCU command being output to increase the propeller speed. The subsequent value of the propeller speed and/or pitch angle is processed by the propeller failure detection module 404, which determines whether propeller failure is persisting despite the PCU command (a condition referred to herein as a "persisting failure condition"). For this purpose, in one embodiment, the propeller failure detection module 404 compares the subsequent value of the propeller speed to the reference speed and/or compares the subsequent value of the pitch angle to the blade angle threshold in the manner described above. If the propeller failure detection module 404 determines that the subsequent value of the propeller speed is below the reference speed and/or that the subsequent value of the pitch angle has failed to decrease (e.g., still exceeds the pitch angle threshold), the persisting failure condition is detected.

In another embodiment, the propeller failure detection module 404 compares the subsequent value of the propeller speed to the propeller speed value obtained in a previous clock cycle (and/or compares the subsequent value of the pitch angle to a pitch angle value obtained in the previous clock cycle) in order to determine whether an expected change (i.e. an increase in propeller speed or a decrease in pitch angle) has been achieved in response to the PCU command. If the propeller failure detection module 404 determines that the subsequent value of the propeller speed is equal to or below the propeller speed value obtained in the previous clock cycle (and/or that the subsequent value of the pitch angle is equal to or above the pitch angle value obtained in the previous clock cycle), meaning that the expected change in propeller speed (and/or pitch angle) has failed to be achieved despite the PCU command, the persisting failure condition is detected. As described above, in one embodiment, detection of the persisting failure condition also implies that the supply of fluid (from the fluid source) to the PCU flow regulator 208 is lost or fluid pressure to the flow regulator 208 is insufficient (since the controller 202 cannot mitigate the decrease in propeller speed (and/or increase in propeller pitch angle) by increasing the opening of the flow regulator 208 to the upstream fluid flow).

In one embodiment, the propeller failure detection module 404 may be configured to assess whether the failure condition has been persisting for a period of time greater than a pre-determined duration, referred to herein as a pre-defined "latch time". The latch time may vary depending on engine configuration and may be obtained by any suitable means, e.g. retrieved from a database, a memory, or other storage medium to which the controller 202 may be communicatively coupled. In this embodiment, if it is determined that the failure condition has persisted for a period of time that exceeds the latch time, the propeller failure detection module 404 confirms that the persisting failure condition (and the loss of fluid supply to the PCU flow regulator 208) is indeed present. In one embodiment, the propeller failure detection module 404 may also be configured to determine the rate at which the propeller 130 is decelerating (i.e. the rate of decrease in propeller speed) and/or the propeller pitch angle is increasing, compare the rate of propeller speed decrease (and/or propeller pitch angle increase) to a threshold, and detect the persisting failure condition (e.g., persisting underspeed and/or persisting pitch angle increase) when the rate is above the threshold.

In one embodiment where the controller 202 is a dual-channel controller comprising an active channel and a standby channel, the propeller failure detection module 404 may also be configured to confirm detection of the persisting failure condition (in the manner described above) on both controller channels. For example, after the persisting failure condition has been detected on a first (i.e. the active) channel, the controller 202 may perform a switch-over from the first channel to a second (i.e. standby) channel. In other words, the propeller failure detection module 404 may be configured to request confirmation of the persisting failure detection conditions on both the first channel and the second channel. This may allow for improved robustness and for protection against incorrect or misleading persisting failure detection.

In one embodiment, the switch-over allows to switch control over the flow regulator 208 from the first channel to the second channel in the event of a failure condition of the first channel (e.g., the first channel being unable to maintain the propeller 130 at the reference speed, leading to the propeller 130 entering into underspeed, and/or to maintain the pitch angle at the pitch angle threshold). After the switch-over, the second channel may attempt to accelerate the propeller 130 and/or decrease the propeller pitch angle (e.g., by causing the governing current of the flow regulator 208 to increase). Upon detecting that the propeller 130 remains in a failure condition (e.g., propeller speed continues to decrease and/or propeller pitch angle continues to increase), the second channel confirms that the propeller failure condition is due to a loss of fluid supply to the flow regulator 208. The channel switch-over may therefore be used to confirm that the propeller 130 failure is not due to a failure of the first channel (e.g., not due to the first channel being unable to cause the governing current of the flow regulator 208 to increase).

Once the persisting failure condition has been detected (and optionally confirmed on both controller channels) by the propeller failure detection module 404, the propeller failure mitigation module 406 is configured to mitigate the persisting failure condition. In one embodiment, mitigation is achieved by the propeller failure mitigation module 406 generating a modified PCU command comprising instructions to cause the electrical actuator 207 to hold the propeller pitch angle (e.g., in order to prevent a further decrease in the rotational speed of the propeller 130). In another embodiment, mitigation is achieved by actuating the PCU flow regulator 208 to the closed configuration described above with reference to FIG. 3C. This may be achieved by the propeller failure mitigation module 406 generating a modified PCU command comprising instructions to cause the flow regulator 208 to be moved to the closed configuration. The propeller failure mitigation module 406 may then send the modified PCU command to the output module 408 for transmission to the PCU flow regulator 208. The PCU flow regulator 208 is then actuated to the closed configuration in which the supply of fluid to the pitch angle actuator 210 (via the flow regulator 208) and the drainage of fluid from the pitch angle actuator 210 (via the flow regulator 208) are prevented.

In some embodiments, upon detection of the persisting failure condition, the output module 408 may also be configured to generate a warning indication or message indicative of the condition and the warning indication may be provided to an aircraft output (reference 214 in FIG. 2A) for cockpit annunciation. Cockpit annunciation may be performed using any suitable means, such as by visual rendering of the warning indication on display(s) provided in the cockpit of the aircraft and/or audio output using any suitable audio output device provided in the aircraft. In one embodiment, the aircraft output 214 is an Aeronautical Radio Inc. (ARINC) output that uses the ARINC 429 data transfer standard for aircraft avionics to output the warning indication. Other data standards may also be used, such as ARINC 615, ARINC 717, and MIL-STD-1553.

The warning indication may be used to prompt the pilot to operate the propeller 130 in a manner that maximizes the availability of propeller thrust. For example, with the propeller 130 in the failure condition, when the propeller 130 is stopped on its way towards the feather position, the pilot may increase engine power to accelerate the propeller 130 to the reference speed. In other words, in one embodiment, the pilot may manually (e.g., by pressing a button or actuating any other suitable control mechanism) activate (i.e. enter) a mode of operation of the propeller control assembly 200 in which the engine power is regulated to achieve the propeller reference speed. Provision of the warning indication may for example make the pilot aware of the fact that increasing the engine power beyond a predetermined threshold may cause the propeller speed to exceed the reference speed and the flow regulator 208 to command more oil drain to cause the propeller to decelerate. This may cause additional loss of fluid supply from the limited reserve of fluid that is available to hold the propeller in the configuration of FIG. 3C. In one embodiment, upon commanding the actuator (e.g., the flow regulator 208 or the electrical actuator 207) to hold the propeller pitch angle, the controller 202 may be configured to automatically adjust engine power to achieve the propeller reference speed. In some embodiments, it may be desirable for the controller to automatically adjust the engine power (rather than having the pilot doing it manually) in order to alleviate the risk of the pilot adding excessive power, which may cause the controller 202 to decelerate the propeller 130 and therefore drain fluid from the fluid reserve.

Referring now to FIG. 5A, FIG. 5B, FIG. 5C, and FIG. 5D, a method 500 for detecting and mitigating a failure condition of a propeller will now be described in accordance with one embodiment. The method 500 is illustratively performed by a controller (such as the controller 202 in FIG. 2A). The method 500 comprises (after start 502), obtaining an actual value of the rotational speed of the propeller and/or the pitch angle of the propeller blades (step 504). The actual value of the rotational speed and/or the pitch angle may be obtained in any suitable manner, for instance from one or more sensors coupled to the propeller, as described above with reference to FIG. 2A. A comparison between the actual value of the rotational speed and a reference speed and/or between the actual value of the pitch angle and a pitch angle threshold is then performed (in the manner described above with reference to FIG. 4). It is assessed at step 506, based on the actual value of the rotational speed (e.g., based on the comparison), whether the rotational speed of the propeller is below the reference speed (indicating an underspeed condition) and/or, based on the actual value of the pitch angle (e.g., based on the comparison), whether the pitch angle is above the pitch angle threshold. If this is not the case, the method 500 ends (step 508). Otherwise, the next step 510 is to command an actuator operatively connected to the propeller blades to decrease the pitch angle of the propeller blades to increase the rotational speed of the propeller towards the reference rotational speed.

As illustrated in FIG. 5C, in one embodiment, the step 510 comprises commanding at step 522 (e.g., by outputting a first PCU command to the PCU, reference 206 in FIG. 2A) the PCU flow regulator (reference 208 in FIG. 2B) to a configuration (referred to herein as a "first configuration") to direct fluid from the fluid source to the pitch angle actuator (reference 210 in FIG. 2B) to decrease the pitch angle of the propeller blades (reference 134 in FIG. 1) and increase the rotational speed of the propeller towards the reference speed. As described above, the first PCU command may cause the PCU flow regulator to be opened for increased fluid supply to the pitch angle actuator in order to transition the propeller blades towards lower angles and increase the propeller speed. In some embodiments, the first PCU command may comprise instructions to increase the governing current of the PCU flow regulator to transition the propeller blades towards lower angles.

As illustrated in FIG. 5D, in another embodiment, step 510 comprises causing at step 522' electrical energy to be supplied to an electrical actuator (reference 207 in FIG. 2B) operatively connected to the propeller blades to cause the electrical actuator to decrease the pitch angle of the propeller blades.

Referring back to FIG. 5A, after step 510 is performed, the next step 512 is to obtain a subsequent value of the rotational speed and/or the pitch angle after commanding the actuator (e.g., after the PCU flow regulator has reached the first configuration). As can be seen from FIG. 5B, it is then assessed at step 514 whether the rotational speed of the propeller has increased towards the reference speed and/or whether the pitch angle has decreased. The assessment is performed at step 514 based on the subsequent actual value of the propeller speed and/or based on the subsequent value of the pitch angle, in the manner described above with reference to FIG. 4. If it is determined at step 514 that the rotational speed of the propeller has increased towards the reference speed and/or the pitch angle has decreased, the method 500 ends (step 508). Otherwise, if it is determined that the rotational speed of the propeller has failed to increase towards the reference speed and/or that the pitch angle has failed to decrease, the next step 516 may be to assess whether the detected failure condition has been present for longer than a pre-defined latch time. Step 516 is optional and may only be performed in some embodiments.

If it is determined at step 516 that the condition has not been present for longer than the pre-defined latch time, the method 500 may flow back to step 514. Otherwise, if it is determined at step 516 that the condition has been present for longer than the pre-defined latch time, the next step 518 may be to obtain confirmation of the inability to increase propeller speed and/or decrease pitch angle (i.e. confirmation of the persisting failure condition) from a second channel. Step 518 is optional and may only be performed in some embodiments where the controller 202 is a dual-channel controller, as described herein above. Upon detection (and optional confirmation at steps 516 and 518) of the persisting failure condition, the method 500 then flows to the step 520 of commanding the actuator to hold the pitch angle of the propeller blades. Holding the pitch angle of the propeller blades prevents a decrease in the rotational speed of the propeller. The method 500 may then end (step 508) after step 520 is performed.

As illustrated in FIG. 5C, in one embodiment, step 520 comprises commanding at step 524 the PCU flow regulator (e.g., by outputting to the PCU a second PCU command) to a configuration (referred to herein as a "second" or "closed" configuration) to block fluid from flowing between the fluid source and the pitch angle actuator and from being diverted away from the pitch angle actuator along the drain line (extending from the PCU flow regulator). The closed configuration is described and illustrated herein with reference to FIG. 3C. As illustrated in FIG. 5D, in another embodiment, step 520 comprises causing at step 524' electrical energy to be supplied to the electrical actuator to cause the electrical actuator to hold the pitch angle of the propeller blades. Also, as discussed herein above, step 520 may comprise commanding a dedicated actuator, referred to herein as a pitch angle modulation arrestor, to hold the pitch angle of the propeller blades.

With reference to FIG. 6, an example of a computing device 600 is illustrated. For simplicity only one computing device 600 is shown but the system may include more computing devices 600 operable to exchange data. The computing devices 600 may be the same or different types of devices. The controller 202 of FIG. 2A may be implemented with one or more computing devices 600. Note that the controller 202 can be implemented as part of a full-authority digital engine controls (FADEC) or other similar device, including electronic engine control (EEC), engine control unit (ECU), electronic propeller control, propeller control unit, and the like. In some embodiments, the controller 202 is implemented as a Flight Data Acquisition Storage and Transmission system, such as a FAST™ system.

The controller 202 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method 500 of FIG. 5A and FIG. 5B such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for detecting and mitigating a failure condition of a propeller described herein may be implemented in a high level procedural or object oriented programming or scripting language, or a combination thereof, to communicate with or assist in the operation of a computer system, for example the computing device 600. Alternatively, the methods and systems for detecting and mitigating a failure condition of a propeller may be implemented in assembly or machine language. The language may be a compiled or interpreted language. Program code for implementing the methods and systems for detecting and mitigating a failure condition of a propeller may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting and mitigating a failure condition of a propeller may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for detecting and mitigating a failure condition of a propeller driven by an engine of an aircraft, the propeller having a plurality of variable pitch propeller blades, the method comprising:
   at a controller,
   obtaining one or both of an actual value of a rotational speed of the propeller and an actual value of a pitch angle of the blades;

in response to one or both of:
  determining, based on the actual value of the rotational speed, that the rotational speed is below a reference rotational speed for the propeller and
  determining, based on the actual value of the pitch angle, that the pitch angle is above a pitch angle threshold,
commanding an actuator operatively connected to the blades to decrease the pitch angle to increase the rotational speed towards the reference rotational speed;
obtaining, after the commanding of the actuator to decrease the pitch angle, one or both of a subsequent value of the rotational speed and a subsequent value of the pitch angle; and
commanding the actuator to hold the pitch angle in response to one or both of:
  determining, based on the subsequent value of the rotational speed, that the rotational speed has failed to increase towards the reference rotational speed, and
  determining, based on the subsequent value of the pitch angle, that the pitch angle has failed to decrease.

2. The method of claim 1, wherein the actuator includes one of or a combination of: an electrical actuator and a hydraulic actuator.

3. The method of claim 1, wherein the actuator includes a hydraulic actuator, wherein the commanding the actuator to decrease the pitch angle comprises commanding a flow regulator located between a fluid source and the hydraulic actuator to a first configuration to direct fluid from the fluid source to the hydraulic actuator to decrease the pitch angle of the blades and increase the rotational speed towards the reference rotational speed, and further wherein the commanding the actuator to hold the pitch angle of the blades comprises commanding the flow regulator to a second configuration to block fluid from flowing between the fluid source and the hydraulic actuator and from being diverted away from the hydraulic actuator along a drain line extending from the flow regulator and located downstream thereof.

4. The method of claim 3, wherein:
  the flow regulator is commanded to the first configuration in which a first port of the flow regulator is fluidly connected to the fluid source to receive a fluid flow therefrom, a second port of the flow regulator is fluidly connected to the hydraulic actuator to direct the fluid flow thereto, and a third port of the flow regulator is fluidly disconnected from the drain line to prevent the fluid flow from being diverted away from the hydraulic actuator to the drain line via the second port and the third port, the fluid source located upstream of the flow regulator and the hydraulic actuator located downstream of the flow regulator; and
  the flow regulator is commanded to the second configuration in which the first port is fluidly disconnected from the fluid source, the second port is fluidly connected to the hydraulic actuator, and the third port is fluidly disconnected from the drain line to prevent fluid from flowing from the fluid source to the hydraulic actuator or from the hydraulic actuator to the fluid source via the first port and the second port, and from flowing from the hydraulic actuator to the drain line via the second port and the third port.

5. The method of claim 4, wherein the commanding the flow regulator to the first configuration comprises causing a displacement member provided within a housing of the flow regulator to expose the first port and the second port and block the third port, the first port, the second port, and the third port each formed as an opening in the housing, and further wherein the commanding the flow regulator to the second configuration comprises causing the displacement member to expose the second port and block the first port and the third port.

6. The method of claim 1, further comprising determining one or both of a period of time during which the rotational speed is below the reference rotational speed and a period of time during which the pitch angle is above the pitch angle threshold, comparing the period of time to a pre-determined duration, and commanding the actuator to hold the pitch angle of the blades in response to determining that the period of time exceeds the pre-determined duration.

7. The method of claim 1, wherein the one or both of determining that the rotational speed has failed to increase towards the reference rotational speed and determining that the pitch angle has failed to decrease is performed on a first controller channel or on the first controller channel and a second controller channel.

8. The method of claim 1, wherein the actuator is commanded to hold the pitch angle until the aircraft lands.

9. The method of claim 1, further comprising, after the commanding the actuator to hold the pitch angle, causing a power of the engine to be adjusted to bring the rotational speed to the reference rotational speed.

10. The method of claim 1, wherein the commanding the actuator to decrease the pitch angle comprises commanding a first actuator operatively connected to the blades to decrease the pitch angle, and further wherein the commanding the actuator to hold the pitch angle comprises commanding a second actuator operatively connected to the blades to hold the pitch angle, the first actuator configured to modulate the pitch angle and the second actuator configured to selectively arrest pitch angle modulation.

11. A system for detecting and mitigating a failure condition of a propeller driven by an engine of an aircraft, the propeller having a plurality of variable pitch propeller blades, the system comprising:
  a processing unit; and
  a non-transitory computer readable medium having stored thereon program code executable by the processing unit for:
    obtaining one or both of an actual value of a rotational speed of the propeller and an actual value of a pitch angle of the blades;
    in response to one or both of:
      determining, based on the actual value of the rotational speed, that the rotational speed is below a reference rotational speed for the propeller and
      determining, based on the actual value of the pitch angle, that the pitch angle is above a pitch angle threshold,
    commanding an actuator operatively connected to the blades to decrease the pitch angle to increase the rotational speed towards the reference rotational speed;
    obtaining, after the commanding of the actuator to decrease the pitch angle, one or both of a subsequent value of the rotational speed and a subsequent value of the pitch angle; and
    commanding the actuator to hold the pitch angle in response to one or both of:
      determining, based on the subsequent value of the rotational speed, that the rotational speed has failed to increase towards the reference rotational speed and determining, based on the subsequent value of the pitch angle, that the pitch angle has failed to decrease.

12. The system of claim 11, wherein the actuator includes one of or a combination of: an electrical actuator and a hydraulic actuator.

13. The system of claim 11, wherein the actuator includes a hydraulic actuator, wherein the program code is executable by the processing unit for commanding a flow regulator located between a fluid source and the hydraulic actuator to a first configuration to direct fluid from the fluid source to the hydraulic actuator to decrease the pitch angle of the blades and increase the rotational speed towards the reference rotational speed, and further wherein the program code is executable by the processing unit for commanding the flow regulator to a second configuration to block fluid from flowing between the fluid source and the hydraulic actuator and from being diverted away from the hydraulic actuator along a drain line extending from the flow regulator and located downstream of the flow regulator to hold the pitch angle of the blades.

14. The system of claim 13, wherein the program code is executable by the processing unit for:
commanding the flow regulator to the first configuration in which a first port of the flow regulator is fluidly connected to the fluid source to receive a fluid flow therefrom, a second port of the flow regulator is fluidly connected to the hydraulic actuator to direct the fluid flow thereto, and a third port of the flow regulator is fluidly disconnected from the drain line to prevent the fluid flow from being diverted away from the hydraulic actuator to the drain line via the second port and the third port, the fluid source located upstream of the flow regulator and the hydraulic actuator located downstream of the flow regulator; and
commanding the flow regulator to the second configuration in which the first port is fluidly disconnected from the fluid source, the second port is fluidly connected to the hydraulic actuator, and the third port is fluidly disconnected from the drain line to prevent fluid from flowing from the fluid source to the hydraulic actuator or from the hydraulic actuator to the fluid source via the first port and the second port, and from flowing from the hydraulic actuator to the drain line via the second port and the third port.

15. The system of claim 14, wherein the program code is executable by the processing unit for:
when the actual value is below the reference rotational speed, commanding the flow regulator to the first configuration comprising causing a displacement member provided within a housing of the flow regulator to expose the first port and the second port and block the third port, the first port, the second port, and the third port each formed as an opening in the housing; and
in response to determining that the rotational speed has failed to increase towards the reference rotational speed, commanding the flow regulator to the second configuration comprising causing the displacement member to expose the second port and block the first port and the third port.

16. The system of claim 11, wherein the program code is executable by the processing unit for determining one or both of a period of time during which the rotational speed is below the reference rotational speed and a period of time during which the pitch angle is above the pitch angle threshold, comparing the period of time to a pre-determined duration, and commanding the actuator to hold the pitch angle of the blades in response to determining that the period of time exceeds the pre-determined duration.

17. The system of claim 11, wherein the program code is executable by the processing unit for the one or both of determining that the rotational speed has failed to increase towards the reference rotational speed and determining that the pitch angle has failed to decrease on a first controller channel or on the first controller channel and a second controller channel.

18. The system of claim 11, wherein the program code is executable by the processing unit for commanding the actuator to hold the pitch angle until the aircraft lands.

19. The system of claim 11, wherein the program code is executable by the processing unit for, after the commanding the actuator to hold the pitch angle, causing a power of the engine to be adjusted to bring the rotational speed to the reference rotational speed.

20. The system of claim 11, wherein the actuator comprises a first actuator configured to modulate the pitch angle and a second actuator configured to selectively arrest pitch angle modulation, and further wherein the program code is executable by the processing unit for commanding the first actuator to decrease the pitch angle in response to the one or both of determining that the rotational speed is below a reference rotational speed for the propeller and determining that the pitch angle is above a pitch angle threshold, and for commanding the second actuator to hold the pitch angle in response to the one or both of determining that the rotational speed has failed to increase towards the reference rotational speed and determining that the pitch angle has failed to decrease.

* * * * *